(12) United States Patent
Isoda

(10) Patent No.: US 6,507,040 B2
(45) Date of Patent: Jan. 14, 2003

(54) RADIATION IMAGE READ-OUT APPARATUS

(75) Inventor: Yuji Isoda, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 2 days.

(21) Appl. No.: 09/823,979

(22) Filed: Apr. 3, 2001

(65) Prior Publication Data

US 2001/0028047 A1 Oct. 11, 2001

(30) Foreign Application Priority Data

Apr. 3, 2000 (JP) ........................................ 2000-100738
Apr. 7, 2000 (JP) ........................................ 2000-106568

(51) Int. Cl.$^7$ ................................................ G01T 1/10
(52) U.S. Cl. ...................................... 250/586; 250/585
(58) Field of Search ................................ 250/586, 583, 250/584, 585, 587, 591, 459.1, 458.1, 363.02, 363.07, 363.08

(56) References Cited

U.S. PATENT DOCUMENTS

| 4,258,264 A | 3/1981 | Kotera et al. ................ 250/484 |
|---|---|---|
| 4,276,473 A | 6/1981 | Kato et al. ................ 250/327.1 |
| 4,387,428 A | 6/1983 | Ishida et al. ................ 364/414 |
| 4,816,679 A | 3/1989 | Sunagawa et al. ....... 250/327.2 |
| 4,922,103 A | 5/1990 | Kawajiri et al. .......... 250/327.2 |
| 6,023,071 A * | 2/2000 | Ogura et al. ................. 250/586 |
| 6,236,058 B1 * | 5/2001 | Ikami ......................... 250/586 |
| 6,326,628 B1 * | 12/2001 | Kimura et al. ............ 250/458.1 |
| 6,326,636 B1 * | 12/2001 | Isoda et al. .................. 250/586 |

FOREIGN PATENT DOCUMENTS

| EP | 0 964 269 A2 | 12/1999 | ............. G01T/1/29 |
|---|---|---|---|
| JP | 55-12429 | 1/1980 | ............. G01T/1/10 |
| JP | 55-116340 | 9/1980 | ............. A61B/6/00 |
| JP | 56-104645 | 8/1981 | ............. A61B/6/00 |
| JP | 60-111568 | 6/1985 | ............. H04N/1/04 |
| JP | 60-236354 | 11/1985 | ............. H04N/1/04 |
| JP | 1-101540 | 4/1989 | ........... G03B/42/02 |
| JP | 2000-66316 | 3/2000 | ........... G03B/42/02 |

* cited by examiner

Primary Examiner—Constantine Hannaher
Assistant Examiner—Otilia Gabor
(74) Attorney, Agent, or Firm—Sughrue Mion PLLC

(57) ABSTRACT

In a radiation image read-out apparatus, the line sensor has a light receiving face whose width in the transverse direction of the line portion of the stimulable phosphor sheet exposed to the line stimulating beam is such that 30% to 90% of the amount of stimulated emission corresponding to a part of the stimulated emission spreading beyond the width of the line stimulating light beam as measured on the plane of the light receiving face of the stimulated emission detecting means can be received by the light receiving face in addition to the amount of stimulated emission corresponding to the width of the line stimulating light beam.

12 Claims, 25 Drawing Sheets

Figure 1:
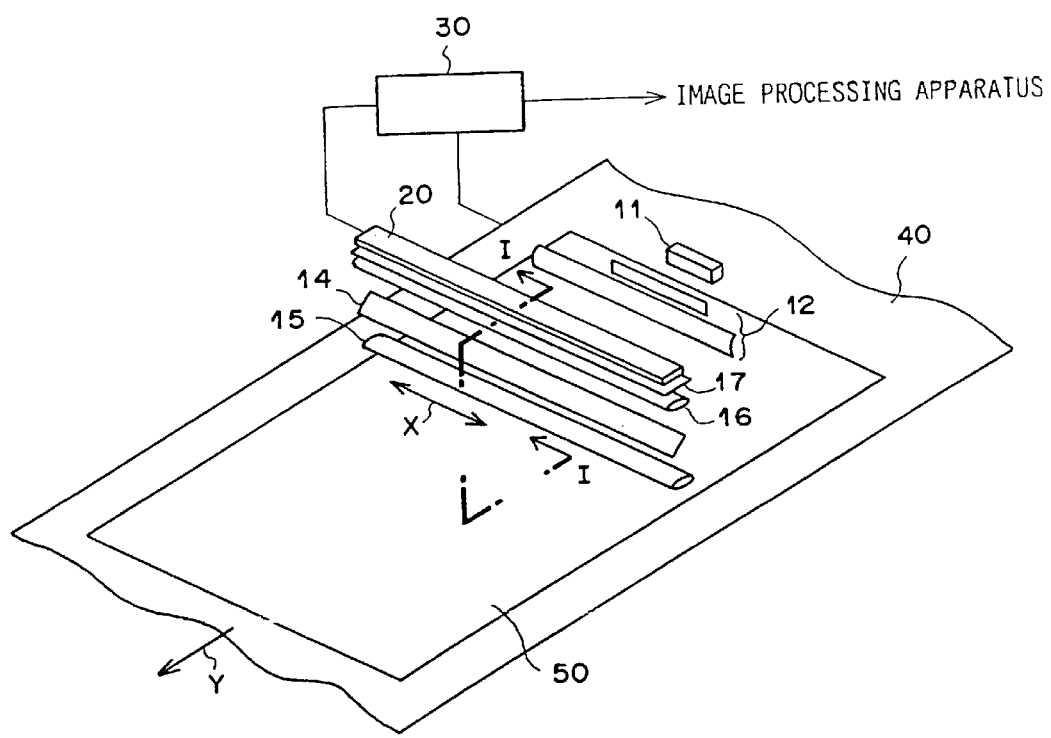

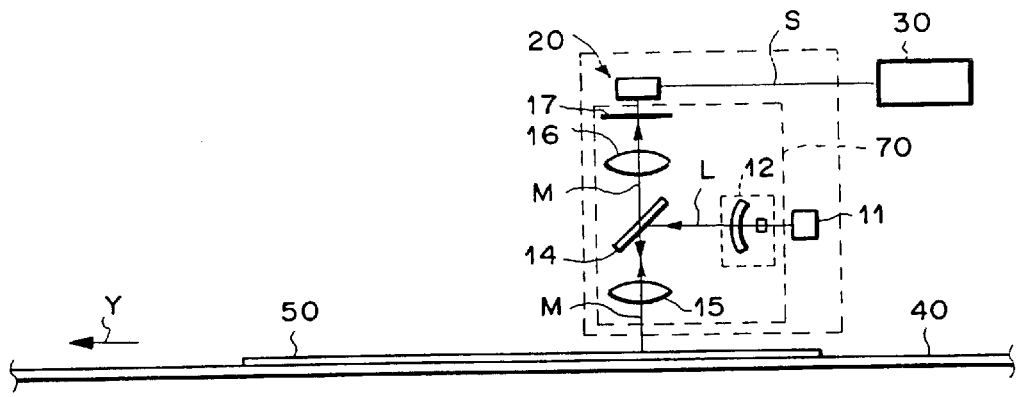
F I G . 2

F I G . 7
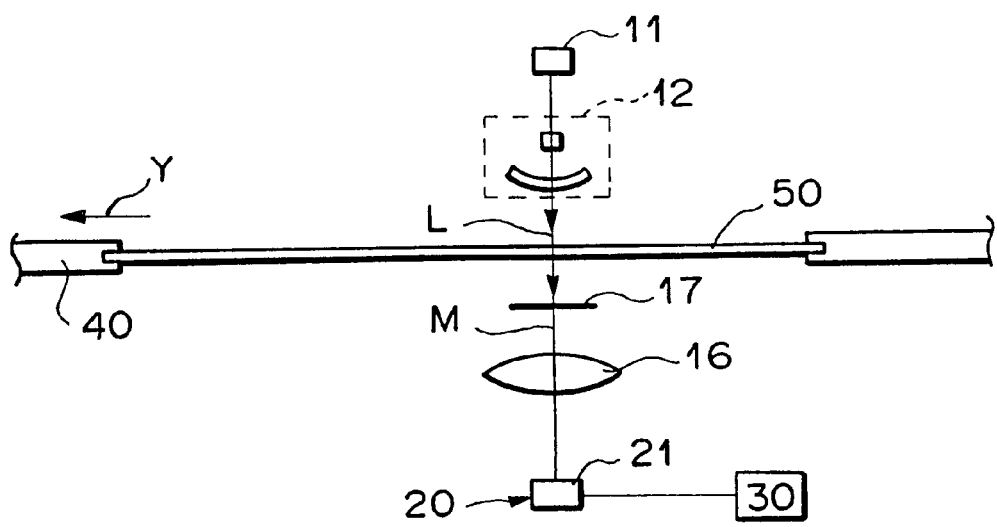

F I G. 17
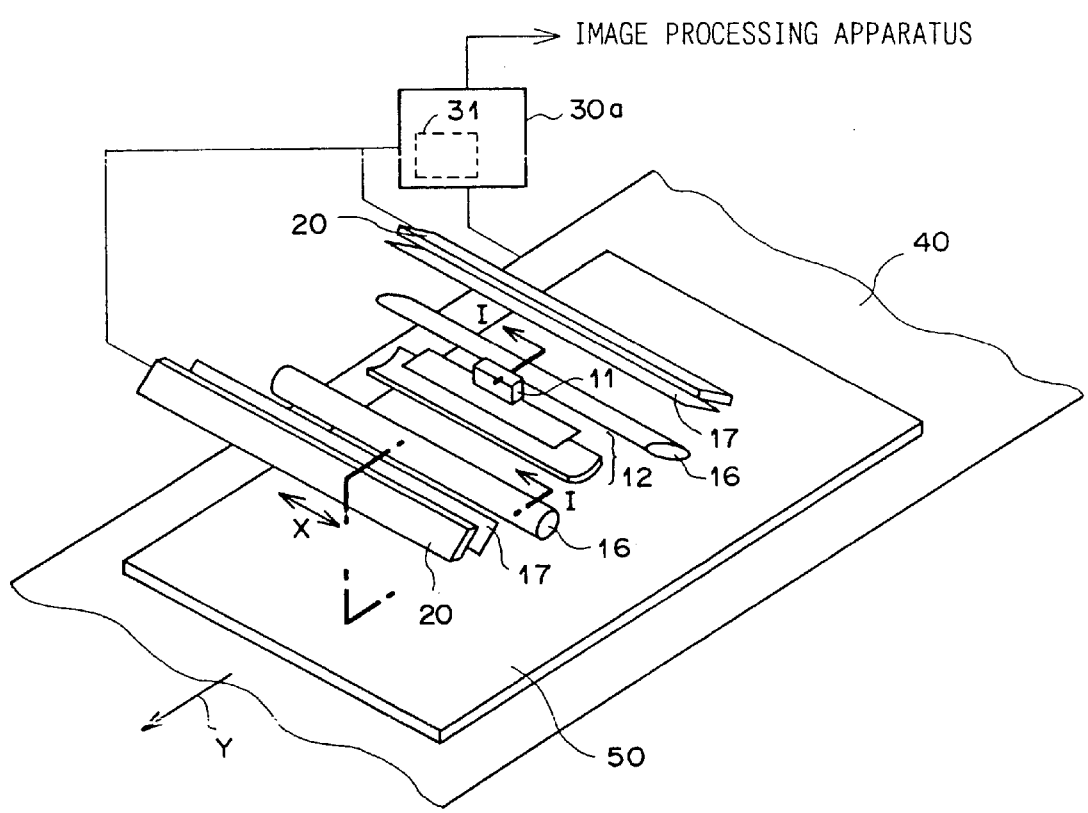

F I G. 18
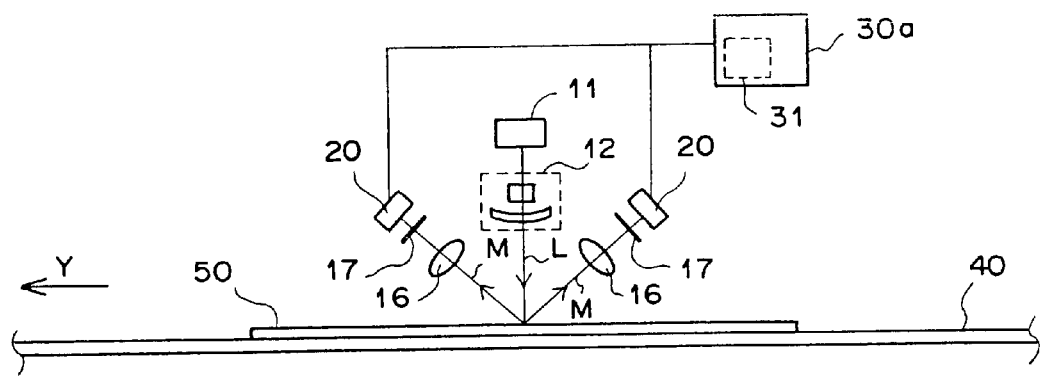

F I G. 19
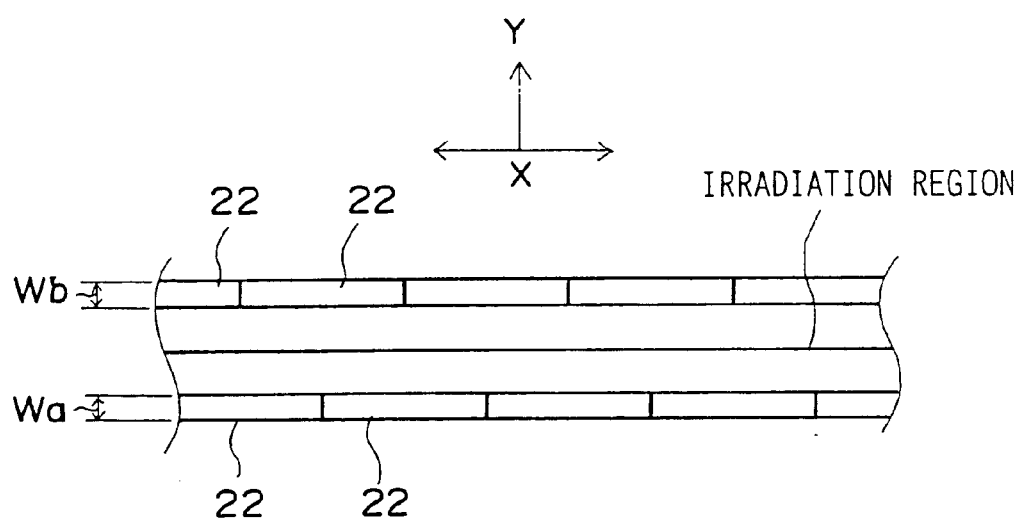

RADIATION IMAGE READ-OUT APPARATUS

BACKGROUND OF THE INVENTION

1. Field of the Invention

This invention relates to a radiation image read-out apparatus which reads out a radiation image stored on a stimulable phosphor sheet by the use of a line sensor.

2. Description of the Related Art

When certain kinds of phosphor are exposed to a radiation, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission. There has been known a radiation image read-out apparatus in which a stimulating light beam such as a laser beam is caused to scan a stimulable phosphor sheet (a sheet provided with a layer of the stimulable phosphor) which has been exposed to a radiation passing through an object such as a human body to have a radiation image of the object stored on the stimulable phosphor sheet, the stimulated emission emitted from the stimulable phosphor sheet pixel by pixel is photoelectrically detected, thereby obtaining an image signal (a radiation image signal), and then the stimulable phosphor sheet is exposed to erasing light after the image signal is obtained from the stimulable phosphor sheet so that the residual energy of the radiation is fully released from the stimulable phosphor sheet. See, for instance, Japanese Unexamined Patent Publication Nos. 55(1980)-12429, 55(1980)-116340 and 56(1981)-104645.

The radiation image signal thus obtained is subjected to image processing such as gradation processing and/or frequency processing and a radiation image of the object is reproduced as a visible image on the basis of the processed radiation image signal on a recording medium such as a photographic film or a display such as a CRT. When the stimulable phosphor sheet is exposed to erasing light, the residual energy of the radiation is fully released from the stimulable phosphor sheet and the stimulable phosphor sheet comes to be able to store a radiation image again, whereby the stimulable phosphor sheet can be repeatedly used.

In the radiation image read-out apparatus, a line light source which projects a line beam onto the stimulable phosphor sheet is used as a stimulating light source and a line sensor having a linear array of photoelectric convertor elements is used as a means for photoelectrically reading out the stimulated emission. The line beam is moved relative to the stimulable phosphor sheet and the line sensor in the direction perpendicular to the longitudinal direction of the line beam by a scanning means. The longitudinal direction of the line beam is referred to as "the main scanning direction" and the direction perpendicular to the longitudinal direction of the line beam is referred to as "the sub-scanning direction". By the use of a line beam and a line sensor, the reading time is shortened, the overall size of the apparatus can be reduced and the cost can be reduced. See, for instance, Japanese Unexamined Patent Publication Nos. 60(1985)-111568, 60(1985)-236354, and 1(1989)-101540.

Figure 21:
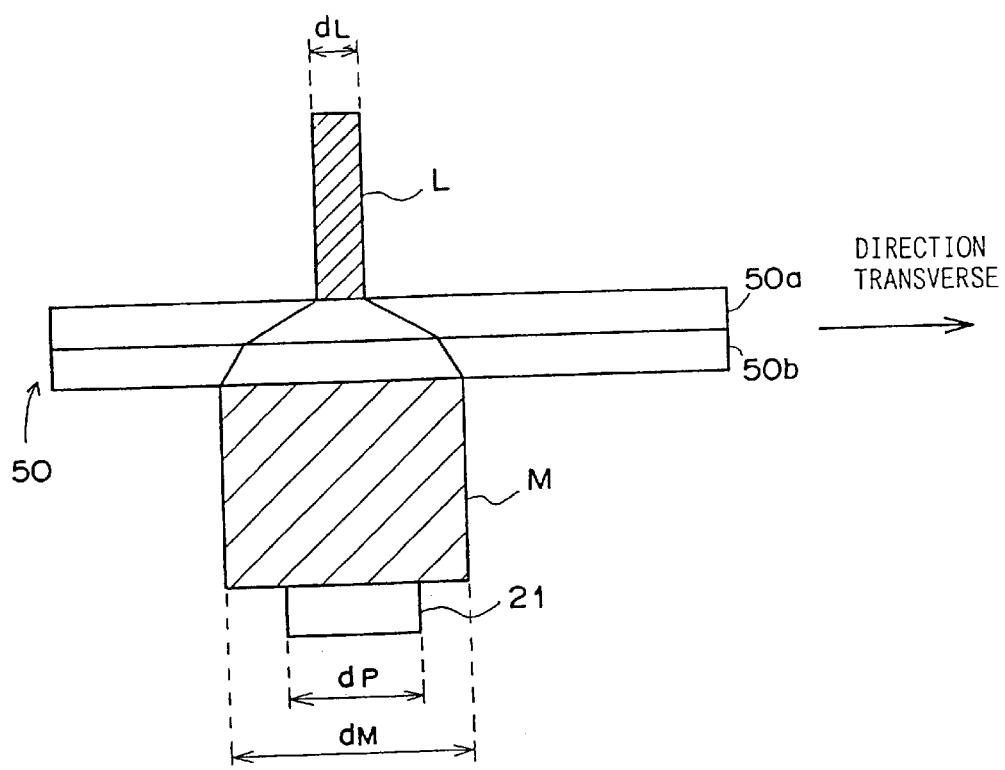

In the case of a transparent stimulable phosphor sheet 50, a stimulable phosphor layer 50a is supported by a support sheet 50b transparent to stimulated emission M and the line beam L is projected onto the stimulable layer side of the stimulable phosphor sheet 50 while the line sensor 21 is disposed on the support sheet side of the same to detect the stimulated emission M passing through the support sheet 50b as shown in FIG. 21. In such a transparent stimulable phosphor sheet 50, as well as in a reflective stimulable phosphor sheet where the line beam and the line sensor are disposed on the same side of the stimulable phosphor sheet, there is a problem that since the stimulating light L is scattered inside the sheet 50 and stimulating emission emitted from the phosphor layer 50a upon exposure to the stimulating light L is also scattered inside the sheet 50, the width $d_M$ of the stimulated emission M passing through the support sheet 50b becomes larger than the width $d_L$ of the line beam L.

As can be understood from FIG. 21, when the width $d_P$ of the line sensor 21 is smaller than the width $d_M$ of the stimulated emission M passing through the support sheet 50b, a substantial part of the stimulated emission M misses the line sensor 21, that is, the stimulated emission accumulating efficiency of the line sensor 21 is poor, and accordingly, a high quality image cannot be obtained.

It is important to minimize the amount of stimulated emission M which misses the line sensor in order to obtain a high quality image.

In Japanese Unexamined Patent Publication No. 2000-66316, we have proposed a radiation image read-out apparatus in which stimulated emission M emitted from a part of the stimulable phosphor sheet exposed to a line stimulating beams is detected by a line sensor comprising a two-dimensional array of photoelectric convertor elements (that is, the line sensor has a plurality of photoelectric convertor elements in both the main scanning direction and the sub-scanning direction) in which the sum of the widths of the photoelectric convertor elements in the sub-scanning direction is substantially equivalent to the width $d_M$ of the stimulated emission M passing through the support sheet 50b as measured on the plane of the light receiving face of the line sensor, and the output of each photoelectric convertor element for each scanning position is processed with respect to the portion of the stimulable phosphor sheet, thereby increasing the stimulated emission accumulating efficiency.

Figure 22:
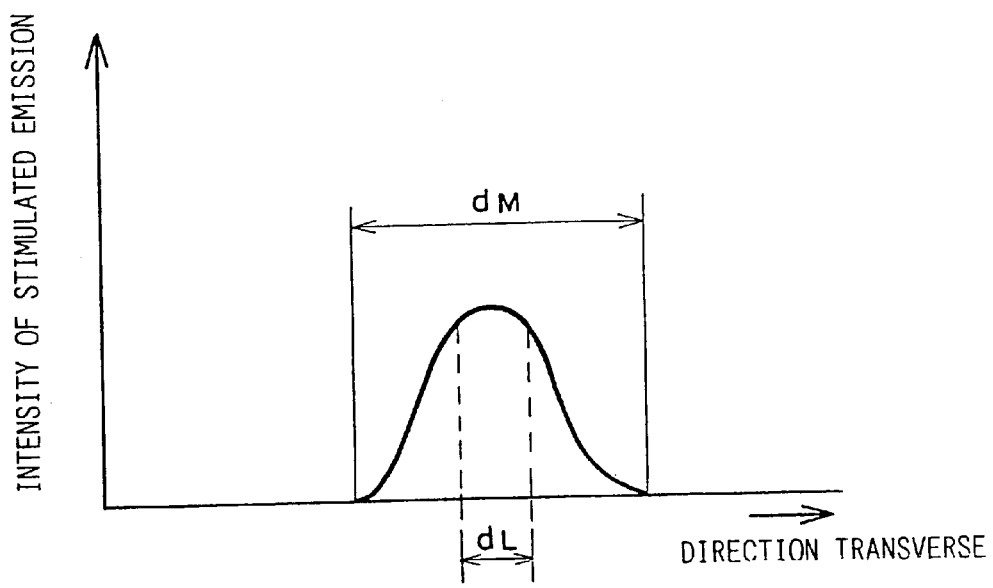

As shown in FIG. 22, the intensity of stimulated emission M is the most high at the portion corresponding to the width $d_L$ of the stimulating light beam and lowers outward. When a plurality of photoelectric convertor elements are arranged in the sub-scanning direction so that the sum of the widths of the photoelectric convertor elements in the sub-scanning direction is substantially equivalent to the width $d_M$ of the stimulated emission M passing through the support sheet as measured on the plane of the light receiving face of the line sensor, substantially the whole stimulated emission M can be accumulated. However, as light becomes weaker, noise becomes relatively stronger, and accordingly, noise becomes stronger relatively to the accumulated stimulated emission. From the viewpoint of cost, it is not preferred to arrange an excessive number of photoelectric convertor elements in the direction of width of the stimulated emission M.

In our Japanese Patent Application No. 2000-217516, there is disclosed a radiation image read-out apparatus using a detecting system comprising a plurality of line sensors arranged in the sub-scanning direction. In the patent application, the width of the detecting system is not mentioned to. When the width of the detecting system is substantially equivalent to the width $d_M$ of the stimulated emission M passing through the support sheet 50*b* as measured on the plane of the light receiving face of the line sensor, the same problem as in the radiation image read-out apparatus disclosed in Japanese Unexamined Patent Publication No. 2000-66316 arises.

SUMMARY OF THE INVENTION

In view of the foregoing observations and description, the primary object of the present invention is to provide a radiation image read-out apparatus in which the stimulated emission accumulating efficiency is improved and a high quality image is obtained without increasing noise and without substantially adding to the cost.

In accordance with the present invention, there is provided a radiation image read-out apparatus comprising a line stimulating light beam source which projects a line stimulating beam extending in a main scanning direction onto a stimulable phosphor sheet storing thereon radiation image information, a stimulated emission detecting means which receives stimulated emission emitted upon exposure to the line stimulating beam from line portions of the stimulable phosphor sheet exposed to the line stimulating beam and converts the amount of stimulated emission received to an electric signal, a sub-scanning means which moves the line stimulating beam and the combination of the line sensor and the stimulable phosphor sheet relatively to each other in a direction (sub-scanning direction) different from the main scanning direction, an image signal read-out means which reads out the output of each photoelectric convertor element in sequence at the respective positions at which the element is moved by the sub-scanning means, wherein the improvement comprises that the stimulated emission detecting means has a light receiving face whose width in the transverse direction of the line portion of the stimulable phosphor sheet exposed to the line stimulating beam is such that 30% to 90% of the amount of stimulated emission corresponding to a part of the stimulated emission spreading beyond the width of the line stimulating light beam as measured on the plane of the light receiving face of the stimulated emission detecting means can be received by the light receiving face in addition to the amount of stimulated emission corresponding to the width of the line stimulating light beam.

As the line stimulating light beam source, a fluorescent lamp, a cold cathode fluorescent lamp, an LED array and such may be employed. The line stimulating light beam source need not be like a line itself so long as it can emit a line stimulating light beam. For instance, a broad area laser may be employed. The stimulating light beam may be continuously emitted from the light beam source or may be emitted therefrom in a pulse-like fashion. From the viewpoint of reduction in noise, preferably the line stimulating light beam is in the form of high output pulsed light.

It is preferred that the length of the line stimulating light beam on the stimulable phosphor sheet be equivalent to or larger than the length of the side of the effective area of the stimulable phosphor sheet parallel to the line stimulating light beam.

It is suitable that the line stimulating light beam is 10 to 4000 μm in width as measured on the surface of the stimulable phosphor sheet.

The direction in which the sub-scanning means moves the line stimulating beam and the combination of the line sensor and the stimulable phosphor sheet relatively to each other (will be referred to as "the sub-scanning direction", hereinbelow) is preferably a direction substantially perpendicular to the line stimulating light beam and the line sensor but may be any direction so long as substantially the entire surface of the stimulable phosphor sheet can be uniformly exposed to the stimulating light beam. Further, the sub-scanning means may move zigzag the line stimulating beam and the combination of the line sensor and the stimulable phosphor sheet relatively to each other.

Figure 23A:
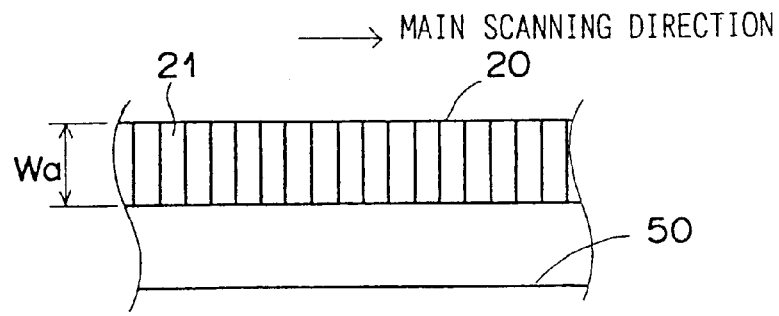

In one embodiment of the present invention, as the stimulated emission detecting means, a line sensor 20 having a one-dimensional array of a number of photoelectric convertor elements 21 as shown in FIG. 23A is employed. In this case, the image signal read-out means reads out the output of each photoelectric convertor element in sequence in the respective positions to which the element is moved by the sub-scanning means. Each of the photoelectric convertor elements 21 has such a width $W_a$ that 30% to 90% of the amount of stimulated emission corresponding to a part of the stimulated emission spreading beyond the width of the line stimulating light beam as measured on the plane of the light receiving face of the line sensor can be received in addition to the amount of stimulated emission corresponding to the width of the line stimulating light beam. It is preferred that the length of the line sensor on the stimulable phosphor sheet be equivalent to or larger than the length of the side of the effective area of the stimulable phosphor sheet parallel to the line stimulating light beam.

It is preferred that the size of each photoelectric convertor element in the main scanning direction be smaller than the size in the direction perpendicular to the main scanning direction.

Figure 23B:
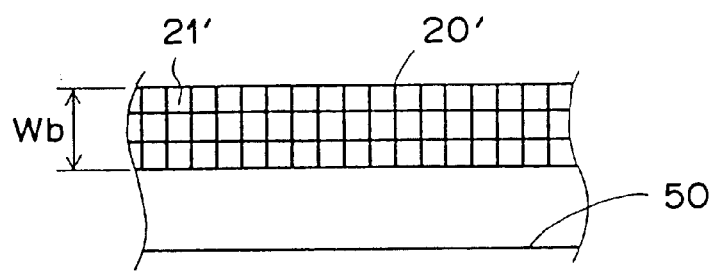

In another embodiment of the present invention, as the stimulated emission detecting means, a line sensor 20' having a two-dimensional array of photoelectric convertor elements 21' as shown in FIG. 23B is employed. In this case, the image signal read-out means is provided with an operation means which carries out operational processing on the outputs of each photoelectric convertor element with respect to the portions of the stimulable phosphor sheet. In the line sensor 20' shown in FIG. 23B, a plurality of photoelectric convertor elements are arranged in both the main scanning direction and the direction perpendicular thereto, and the sum $W_b$ of the widths of the elements arranged in the direction perpendicular to the main scanning direction is such that 30% to 90% of the amount of stimulated emission corresponding to a part of the stimulated emission spreading beyond the width of the line stimulating light beam as measured on the plane of the light receiving face of the line sensor can be received in addition to the amount of stimulated emission corresponding to the width of the line stimulating light beam.

When the number of photoelectric convertor elements is large to such an extent that influence of transfer rate is recognizable, shortening of charge accumulating time due to increase in charge transfer time may be avoided by once storing the charge accumulated in each photoelectric convertor element in a memory, and reading out the charge from the memory during a next charge accumulating cycle.

It is preferred that the line sensor includes not less than 1000 photoelectric convertor elements in the longitudinal direction thereof, and that the light receiving face of the line sensor be not shorter than the corresponding side of the stimulable phosphor sheet.

Though the line sensor 20' shown in FIG. 23B has a number of photoelectric convertor elements 21' which are arranged in a straight line in each of the longitudinal and transverse directions of the stimulated emission but the photoelectric convertor elements 21' may be arranged in other patterns. For example, the photoelectric convertor elements 21' may be arranged zigzag in the transverse direction of the stimulated emission and arranged in a straight line in the longitudinal direction, and may be arranged zigzag in the longitudinal direction of the stimulated emission and arranged in a straight line in the transverse direction.

Further, the line sensor may comprise a plurality of sensor chips each comprising a plurality of photoelectric convertor elements. In this case, the chips maybe arranged in a straight line in the longitudinal direction of the line sensor or zigzag in the longitudinal direction of the line sensor. From the viewpoint of easiness of manufacture, it is preferred that each sensor chip comprises a plurality of photoelectric convertor elements arranged in both the longitudinal direction and the transverse direction.

In still another embodiment of the present invention, the stimulated emission detecting means comprises a plurality of line sensors arranged in the transverse direction. In this case, the image signal read-out means is provided with an operation means which carries out operational processing on the outputs of each line sensor with respect to the portions of the stimulable phosphor sheet. The line sensors may be disposed close to each other, or a part from each other. Further, the line sensors may be disposed even on opposite sides of the stimulable phosphor sheet.

Figure 23C:
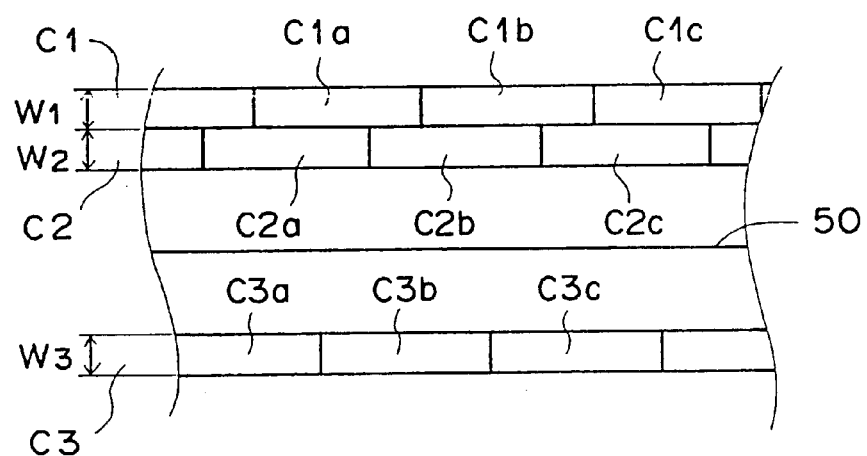

FIG. 23C shows an example of the stimulated emission detecting means comprising a plurality of line sensors arranged in both the longitudinal direction and the transverse direction. That is, the stimulated emission detecting means shown in FIG. 23C comprises a pair of line sensors C1 and C2 which are arranged in the transverse direction are disposed above the stimulable phosphor sheet 50 and a line sensor C3 which is disposed below the stimulable phosphor sheet 50. The line sensor C1 comprises a number short line sensors (e.g., C1a, C1b, C1c), the line sensor C2 comprises a number short line sensors (e.g., C2a, C2b, C2c), and the line sensor C3 comprises a number short line sensors (e.g., C3a, C3b, C3c). The width of the stimulated emission detecting means is equivalent to the sum of the widths W1, W2 and W3 of the respective line sensors C1, C2 and C3, and is such that 30% to 90% of the amount of stimulated emission corresponding to a part of the stimulated emission spreading beyond the width of the line stimulating light beam as measured on the plane of the light receiving face of the stimulated emission detecting means can be received in addition to the amount of stimulated emission corresponding to the width of the line stimulating light beam.

AS the line sensor, an amorphous silicon sensor, a CCD sensor, a CCD sensor with a back illuminator, a MOS image sensor and such can be employed.

The operational processing which the image signal read-out means carries out on the outputs of the photoelectric convertor element may be simple addition, weighted addition or such. In such a case, the image signal read-out means may be an adder.

The expression "the amount of stimulated emission corresponding to a part of the stimulated emission spreading beyond the width of the line stimulating light beam as measured on the plane of the light receiving face of the line sensor" means as follows. That is, the stimulated emission emitted from a portion of the stimulable phosphor sheet exposed to a line stimulating light beam of a first width generally spread and becomes wider than the first width as measured on the plane of the light receiving face of the line sensor. The width of the line stimulating light beam as measured on the stimulable phosphor sheet will be sometimes referred to as"the irradiation width", hereinbelow. "A part of the stimulated emission spreading beyond the width of the line stimulating light beam as measured on the plane of the light receiving face of the line sensor" means the part by which the stimulated emission spreads beyond the width of the line stimulating light beam as measured on the plane of the light receiving face of the line sensor". When an enlargement/reduction optical system is inserted between the stimulable phosphor sheet and the line sensor, the width of the stimulated emission should be compared with the first width as enlarged or reduced by the enlargement/reduction optical system.

The irradiation width is a width of the line stimulating light beam as measured on the surface of the stimulable phosphor sheet. Ideally, the stimulating light beam does not diverge as shown by the broken line in FIG. 24 but actually somewhat diverges as shown by the solid line in FIG. 24. Accordingly, "the width of the line stimulating beam" or "the irradiation width" is defined to be the distance between positions in which he intensity of the stimulating light beam becomes 1/e of the original intensity as denoted by $d_L$ in FIG. 24.

Figures 25A, 25B, 25C:
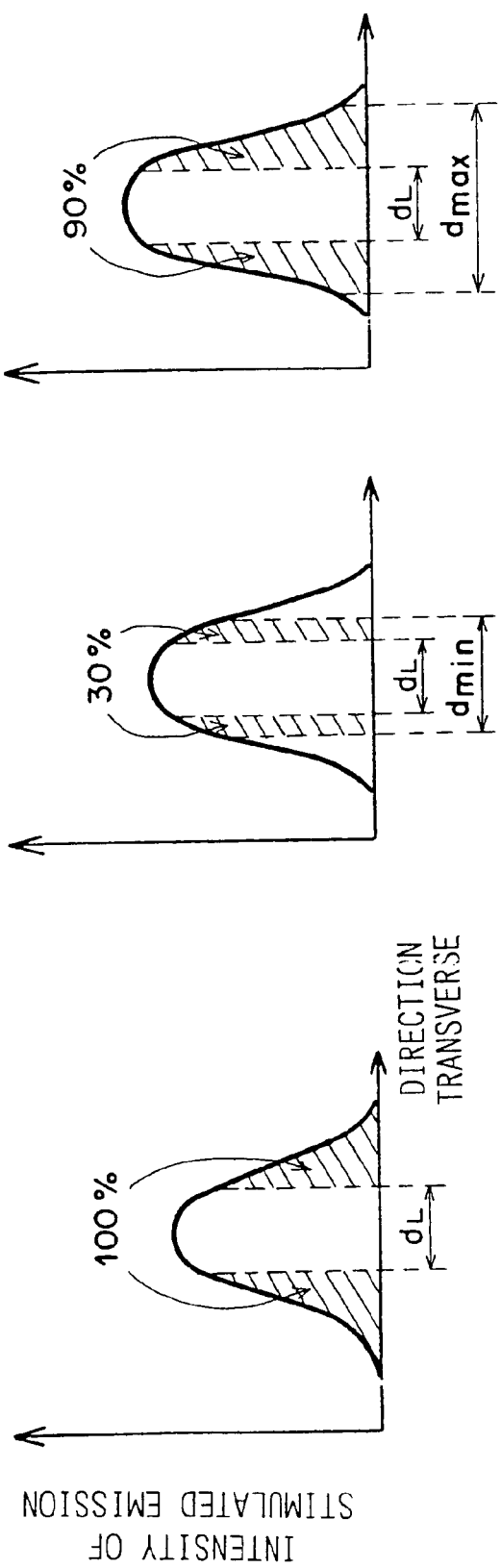

The hatched part in FIG. 25A shows the whole amount (100%) of stimulated emission corresponding to a part of the stimulated emission spreading beyond the irradiation width $d_L$ as measured on the plane of the light receiving face of the stimulated emission detecting means. The hatched part $d_{min}$ in FIG. 25B shows 30% of stimulated emission corresponding to a part of the stimulated emission spreading beyond the irradiation width $d_L$ as measured on the plane of the light receiving face of the stimulated emission detecting means. The hatched part $d_{max}$ in FIG. 25C shows 90% of stimulated emission corresponding to a part of the stimulated emission spreading beyond the irradiation width $d_L$ as measured on the plane of the light receiving face of the stimulated emission detecting means.

Spread of the stimulated emission is preferably measured in the following manner. That is, a stimulable phosphor sheet is exposed to the line stimulating light beam with the area to be exposed being limited by a lead plate and the stimulated emission is received by a CCD or photographic film. Then spread of the stimulated emission is measured in the term of the value of a count in the case of the CCD and in the term of the density distribution measured by a micro densitometer after development in the case of the photographic film.

It is preferred that the stimulable phosphor sheet be an anisotropic stimulable phosphor sheet which emits the stimulated emission in a direction inclined at a predetermined angle to the direction of thickness of the sheet.

It is further preferred that the anisotropic stimulable phosphor sheet be formed by anisotropic deposition.

It is preferred that a collector optical system for collecting the stimulated emission on the light receiving face of the stimulated emission detecting means be disposed between the stimulable phosphor sheet and the stimulated emission detecting means. As such a collector optical system, may be employed a refractive index profile type lens array such as a SELFOC® lens array which is formed by an imaging system where the object plane and the image plane are in one to one correspondence, a rod lens array and the like, a cylindrical lens, a slit, an optical fiber bundle or a combination of these optical elements be disposed between the stimulable phosphor sheet and the line sensor.

Further, the stimulated emission accumulating efficiency may be increased by bringing the stimulable phosphor sheet and the stimulated emission detecting means into a close contact with each other without inserting an imaging system. In such a case, an optical fiber bundle may be provided between the stimulable phosphor sheet and the stimulated emission detecting means to guide the stimulated emission from the stimulable phosphor sheet to the light receiving face of the stimulated emission detecting means.

It is further preferred that a stimulating light cut filter (a sharp cut filter, a band pass filter and such) which does not transmit the stimulating light but transmits the stimulated emission be provided between the stimulable phosphor sheet and the stimulated emission detecting means to prevent the stimulating light from entering the stimulated emission detecting means.

In accordance with the present invention, the stimulated emission accumulating efficiency can be moderately increased and a high quality image can be obtained without increasing noise and without substantially adding to the cost.

When a line sensor having a number of photoelectric convertor elements one-dimensionally arranged in the main scanning direction (the longitudinal direction of the stimulate emission) is employed as the stimulated emission detecting means, the apparatus can be simple in structure. In this case, when the size of each photoelectric convertor element in the longitudinal direction is smaller than that in the transverse direction, the stimulated emission accumulating efficiency can be increased without deteriorating the reading density (pixel density).

When a line sensor having a number of photoelectric convertor elements two-dimensionally arranged in the longitudinal direction and the transverse direction is employed as the stimulated emission detecting means, difficulties in making large size photoelectric convertor elements can be avoided since a large size photoelectric convertor element can be formed by a plurality of small size photoelectric convertor elements.

When the stimulable phosphor sheet is an anisotropic stimulable phosphor sheet which emits the stimulated emission in a direction inclined at a predetermined angle to the direction of thickness of the sheet, spread of stimulated emission itself is suppressed and accordingly the stimulated emission accumulating efficiency can be further increased.

When the anisotropic stimulable phosphor sheet is formed by anisotropic deposition, the purity of the stimulable phosphor can be increased and the stimulated emission emitting efficiency can be increased, which increases the stimulated emission accumulating efficiency. Further, the anisotropic stimulable phosphor sheet formed by anisotropic deposition is more easy to control as compared with anisotropic stimulable phosphor sheets formed by other methods.

DESCRIPTION OF THE PREFERRED EMBODIMENTS

Figure 3:
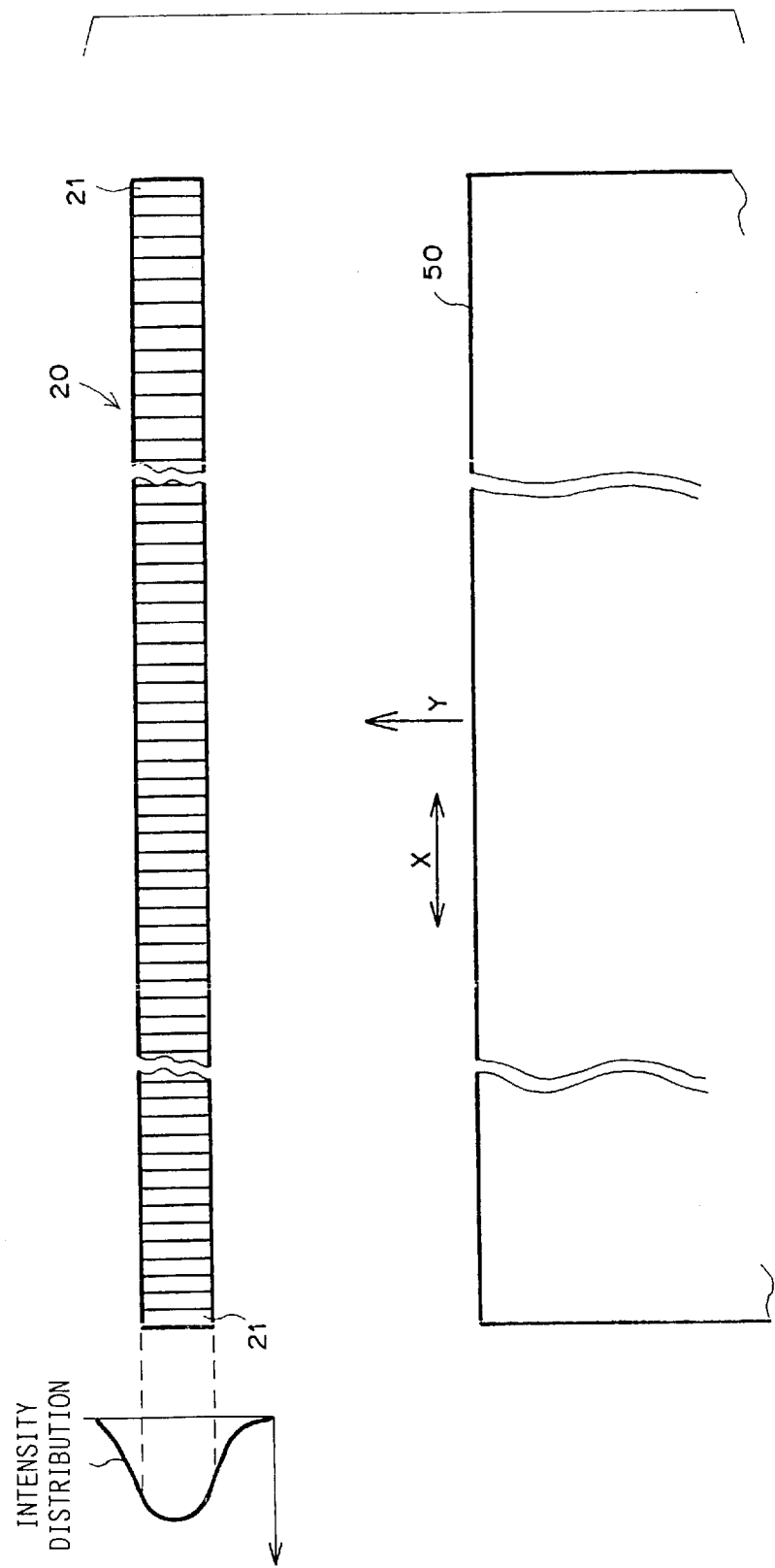
Figure 4:
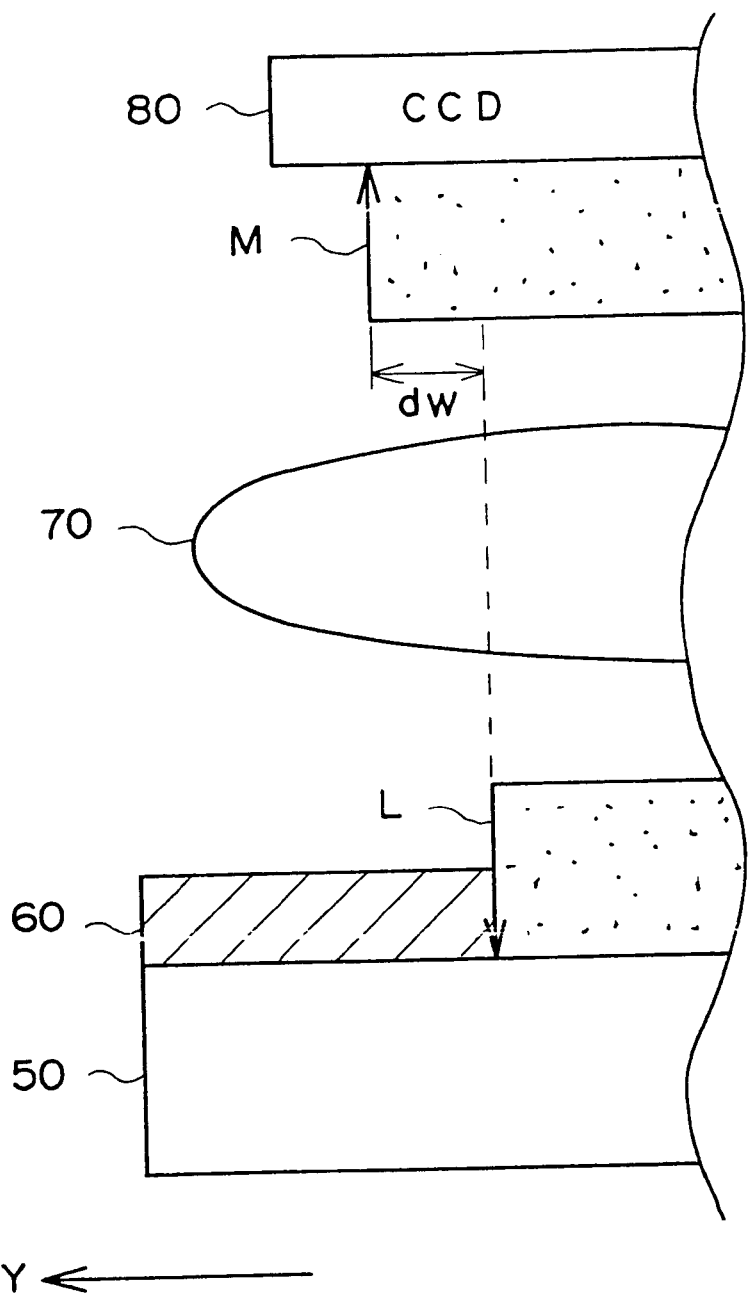
Figures 5A, 5B:
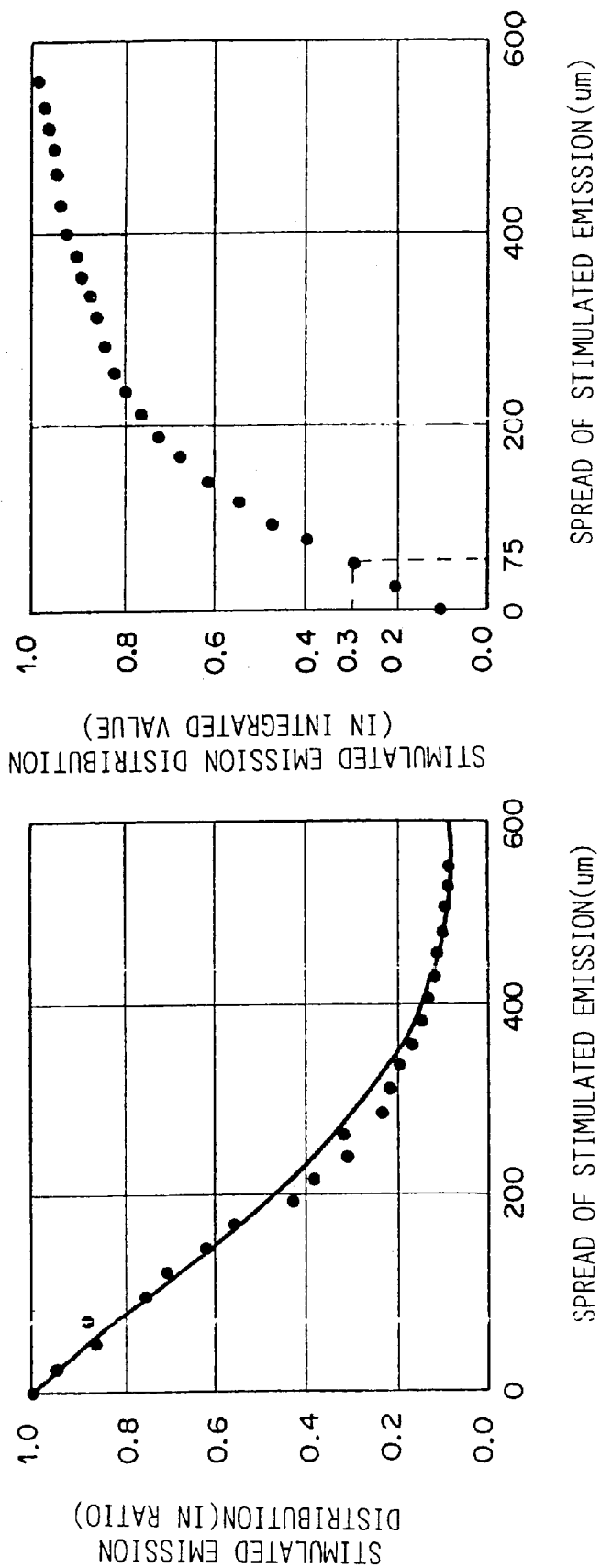
Figure 6:
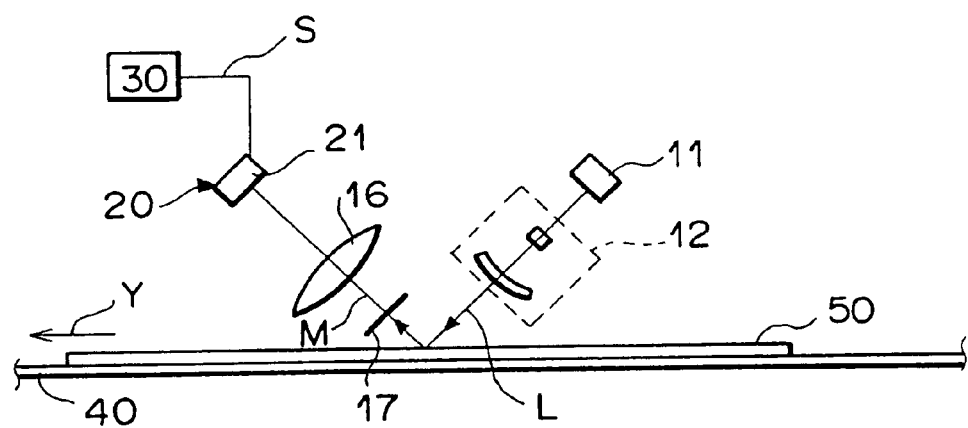
Figure 8:
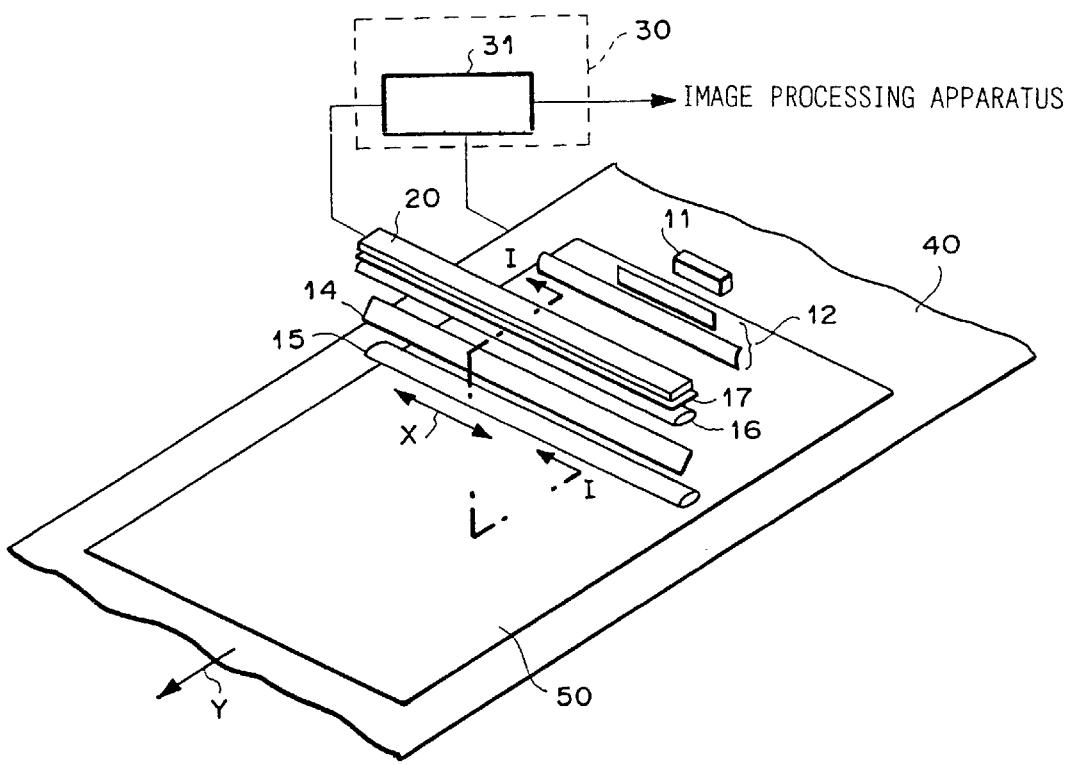
Figure 9:
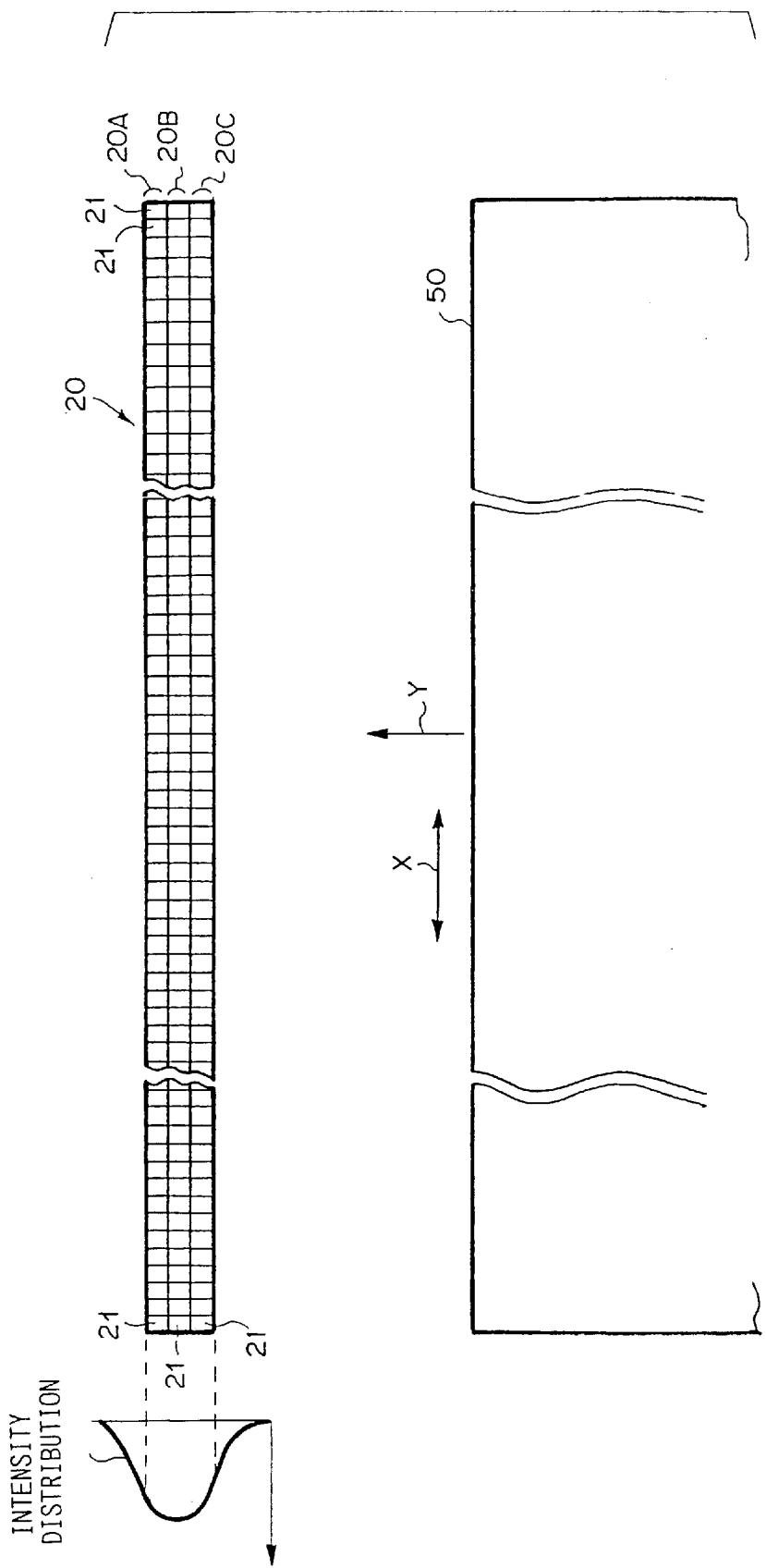
Figure 12:
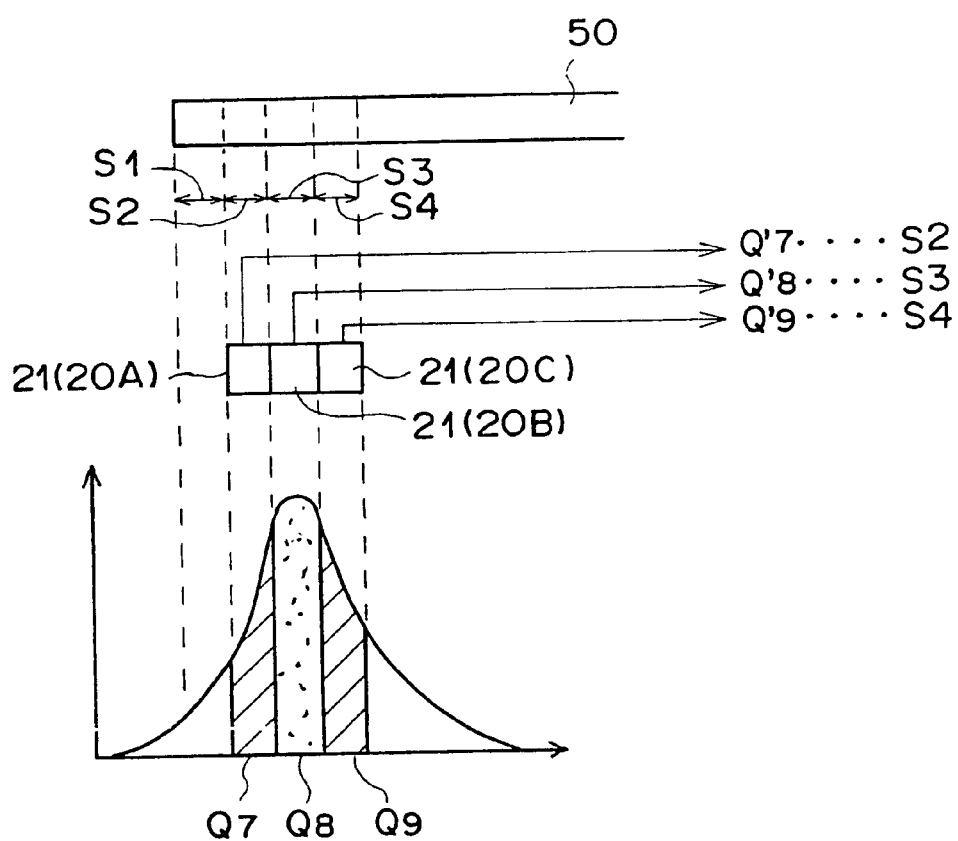
Figure 13:
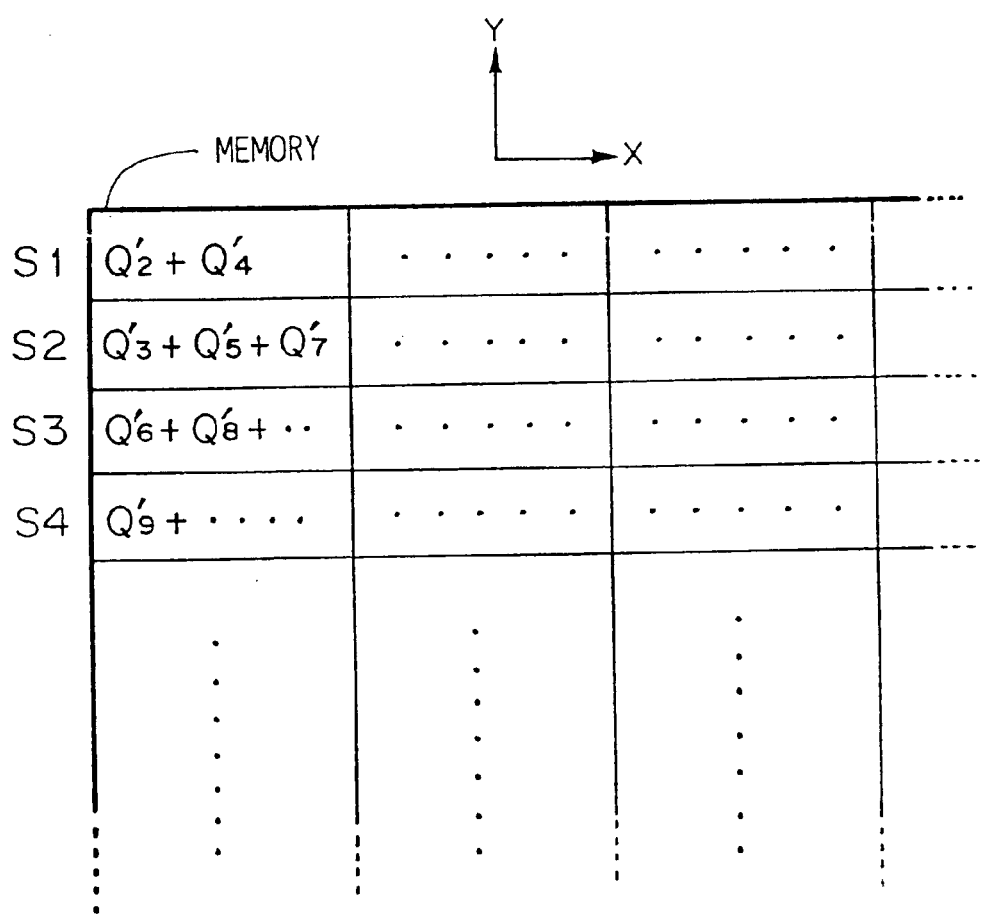
Figure 14:
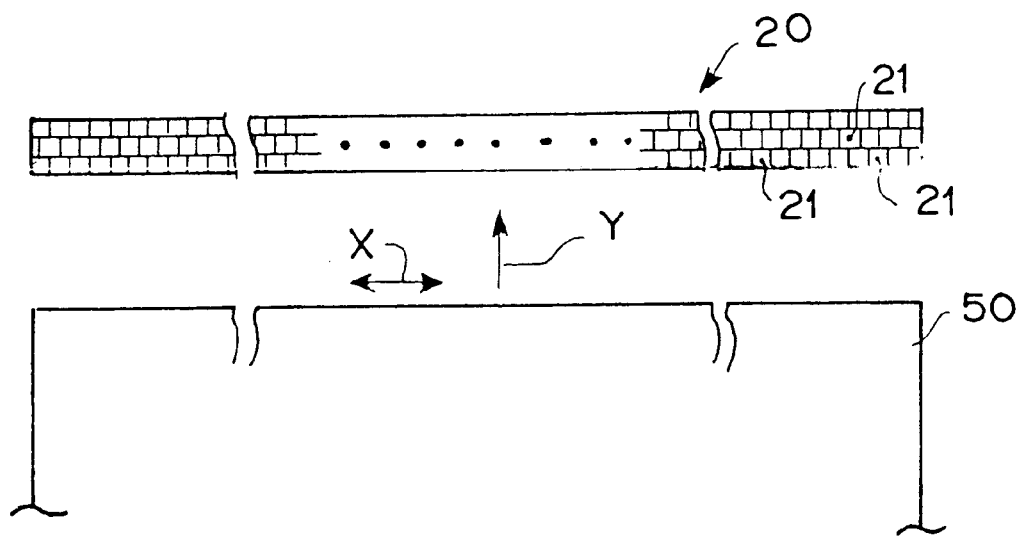
Figure 15:
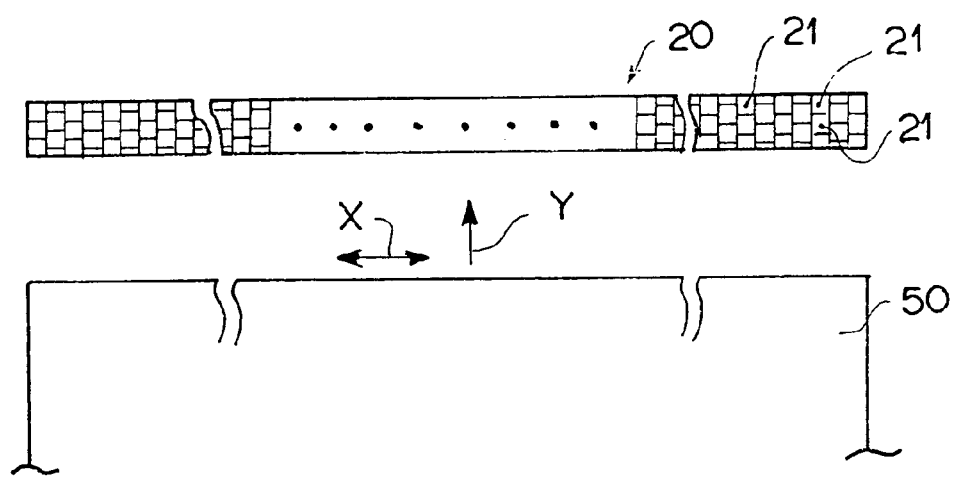
Figure 20:
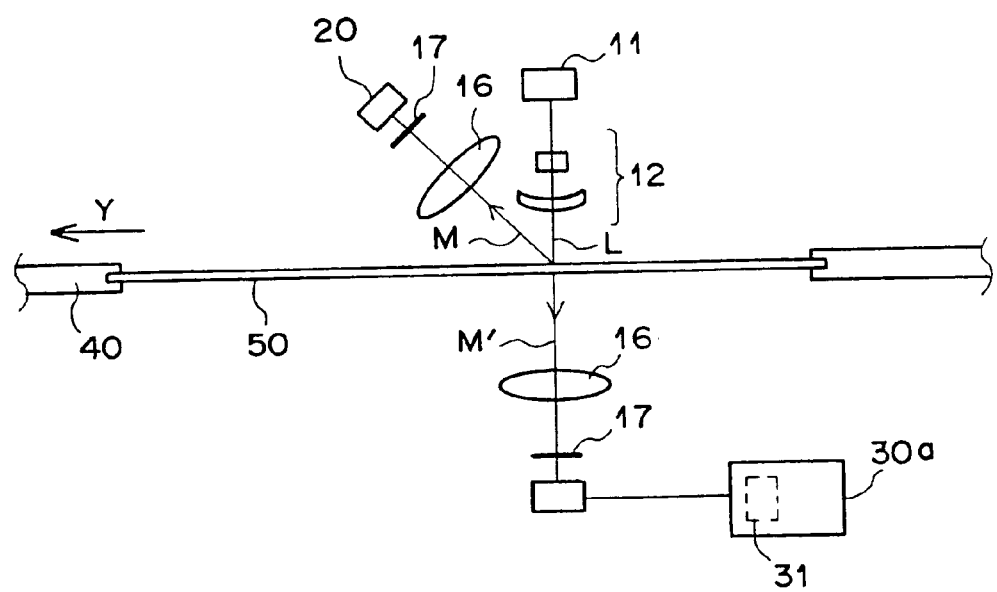
Figure 24:
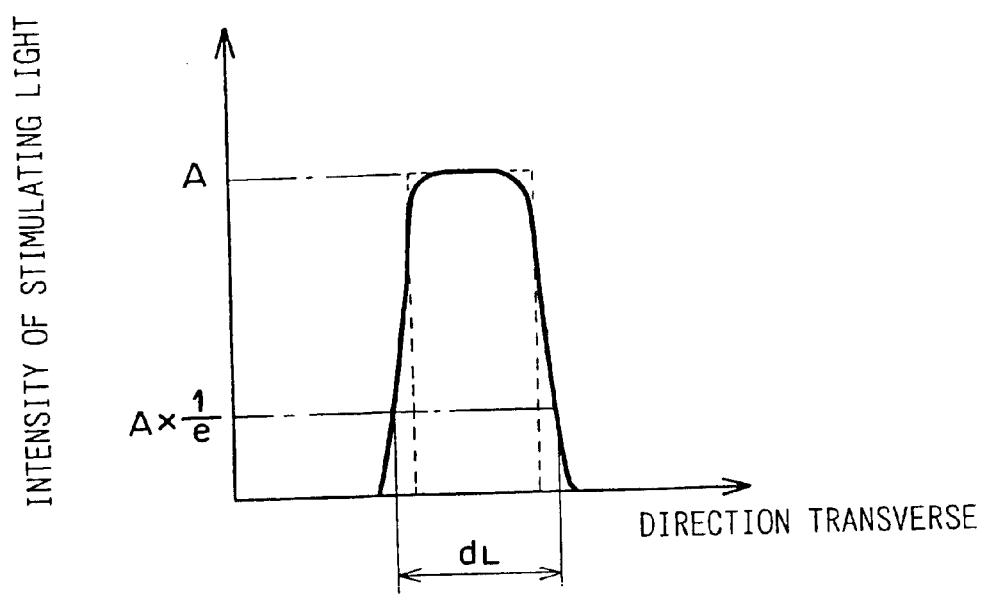

FIG. 1 is a schematic perspective view showing a radiation image read-out apparatus in accordance with a first embodiment of the present invention, FIG. 2 is a cross-sectional view taken along line I—I in FIG. 1, FIG. 3 is a view showing in detail the line sensor of the radiation image read-out apparatus of the first embodiment, FIG. 4 is a schematic view for illustrating a method of measuring spread of stimulated emission, FIGS. 5A and 5B are views showing the distribution of the amount of stimulated emission in the over-spread part for the stimulable phosphor sheet employed in the first embodiment as measured by the method shown in FIG. 4, FIG. 6 is a view for illustrating a radiation image read-out apparatus in accordance with a second embodiment of the present invention, FIG. 7 is a view for illustrating a radiation image read-out apparatus in accordance with a third embodiment of the present invention, FIG. 8 is a schematic perspective view showing a radiation image read-out apparatus in accordance with a fourth embodiment of the present invention, FIG. 9 is a view showing in detail the line sensor of the radiation image read-out apparatus of the fourth embodiment, FIGS. 10 to 13 are views for illustrating operation of the radiation image read-out apparatus of the fourth embodiment, FIGS. 14 and 15 are views illustrating modifications of arrangement of the photoelectric convertor elements in the line sensor, FIGS. 16A to 16I are views for illustrating various ways of forming a long line sensor by a plurality of small sensor chips, FIG. 17 is a cross-sectional view for illustrating a radiation image read-out apparatus in accordance with a fifth embodiment of the present invention, FIG. 18 is a cross-sectional view taken along line I—I in FIG. 17, FIG. 19 is a view illustrating in detail the image signal read-out means, FIG. 20 is a view for illustrating a modification of the fifth embodiment, FIG. 21 is a view for illustrating spread of the stimulated emission, FIG. 22 is a view showing a typical intensity distribution of the stimulated emission, FIGS. 23A to 23C are views for illustrating various examples of the image signal read-out means which can be employed in the present invention, FIG. 24 is a view for illustrating the width of the stimulating light beam, and FIGS. 25A to 25C are views for illustrating the amount of stimulated emission corresponding to a part of the stimulated emission spreading beyond the width of the line stimulating light beam.

DESCRIPTION OF THE PREFERRED EMBODIMENTS

In FIGS. 1 to 3, a radiation image read-out apparatus in accordance with a first embodiment of the present invention comprises an endless belt (a sub-scanning means) 40 which conveys a stimulable phosphor sheet 50 (storing thereon a radiation image) in the direction of arrow Y; a broad area laser 11 which emits a line stimulating light beam L 100 $\mu$m wide in parallel to the surface of the stimulable phosphor sheet 50; an optical system 12 formed by a combination of a collimator lens which condenses the line stimulating light beam L emitted from the broad area laser 11 and a toric lens which spreads the light beam only in one direction; a dichroic mirror 14 which is inclined at 45° to the surface of the stimulable phosphor sheet 50 and transmits stimulated emission M while reflecting the line stimulating light beam L; a first a SELFOC lens array 15 which is an array of a plurality of refractive index profile type lenses, converges the line stimulating light beam L reflected by the dichroic mirror 14 to impinge upon the stimulable phosphor sheet 50 in a pattern of a line about 100 µm wide extending in the direction of arrow X and collimates into a parallel light bundle stimulated emission M emitted from the part of the stimulable phosphor sheet 50 exposed to the line stimulating light beam; a second SELFOC lens array 16 which converges the stimulated emission M which passes through the dichroic mirror 14 onto the light receiving face of a line sensor 20; a stimulating light cut filter 17 which cuts the stimulating light L in the stimulated emission N passing through the second SELFOC lens array 16; the line sensor 20 which has an array of photoelectric convertor elements 21 which receive the stimulated emission M and convert it into an electric image signal; and an image signal reading means 30 which outputs the image signals output from the respective photoelectric convertor elements 21.

The first SELFOC lens array 15 images a light emitting region of the stimulable phosphor sheet 50 on the dichroic mirror 14 in a natural size, and the second SELFOC lens array 16 transfers the image of the light emitting region of the stimulable phosphor sheet 50 on the dichroic mirror 14 to the light receiving face of the line sensor 20 in a natural size.

The optical system 12 formed by the collimator lens and the toric lens enlarges the image of the line stimulating light beam L from the broad area laser 11 to a desired size, thereby changing the irradiation size.

As shown in FIG. 3, the line sensor 20 comprises a number of photoelectric convertor elements (e.g., 1000 or more) photoelectric convertor elements 21 arranged in the direction of arrow X. Each photoelectric convertor element 21 is extended in the direction of arrow Y so that 30% to 90% of the amount of stimulated emission corresponding to a part of the stimulated emission spreading beyond the width of the line stimulating light beam as measured on the plane of the light receiving face of the line sensor can be received by the line sensor. Each photoelectric convertor element 21 may be, for instance, an amorphous silicon sensor, a CCD sensor or a MOS image sensor.

Spread of the stimulated emission may be measured in various ways. For example, it may be measured in the manner shown in FIG. 4. As shown in FIG. 4, apart of the stimulable phosphor sheet 50 is first covered with a lead plate 60, thereby defining a region to be exposed to the stimulating light. In this state, a stimulating light spot or a line stimulating light beam is caused to scan the entire surface of the stimulable phosphor sheet 50, and then the whole stimulated emission is projected onto a CCD 80 through an optical system 70. The CCD 80 has a light receiving face sufficiently wide to receive the whole stimulated emission including the part $d_W$ of the stimulated emission spreading beyond the width of the region defined to be exposed to the stimulating light (will be referred to as "the over-spread part $d_W$", hereinbelow)

FIG. 5A shows the distribution of the amount of stimulated emission in ratio in the over-spread part $d_W$ for the stimulable phosphor sheet 50 employed in this embodiment as measured by the method shown in FIG. 4, and FIG. 5B shows the distribution of the amount of stimulated emission in integrated value in the over-spread part $d_W$ for the stimulable phosphor sheet 50 employed in this embodiment as measured by the method shown in FIG. 4. As can be seen from FIGS. 5A and 5B, in this particular embodiment, since the width of the line stimulating light beam is 100 µm, in order to receive 30% ($d_W$=75 µm) to 90% ($d_W$=500 µm) of the amount of stimulated emission corresponding to the over-spread part $d_W$, the width W of the photoelectric convertor element arranged in the direction of arrow Y should be 250 µm to 1100 µm according to the following formula.

$$W=d_L+2\times d_W \quad (1)$$

Since the distribution of the amount of stimulated emission in the over-spread part $d_W$ on only one side can be obtained by the method shown in FIG. 4, $d_W$ is doubled in formula (1).

Operation of the radiation image read-out apparatus of this embodiment will be described, hereinbelow.

The endless belt 40 is driven to convey the stimulable phosphor sheet 50 stored thereon a radiation image in the direction of arrow Y in FIG. 1. While the broad area laser 11 emits a line stimulating light beam L about 100 µm wide substantially in parallel to the surface of the stimulable phosphor sheet 50. The line stimulating light beam L is converted to a parallel light beam by the optical system 12 (the collimator lens and the toric lens) and reflected by the dichroic mirror 14 to impinge upon the stimulable phosphor sheet 50 in perpendicular thereto after condensed by the first SELFOC lens array 15 into a line beam about 100 µm wide ($d_L$=about 100 µm) which extends in the direction of arrow X on the surface of the stimulable phosphor sheet 50.

The line stimulating light beam L impinging upon the stimulable phosphor sheet 50 stimulates the stimulable phosphor in the area corresponding to its width $d_L$ and at the same time is scattered inside the stimulable phosphor sheet 50 to stimulate also the stimulable phosphor near the area corresponding to the width $d_L$. As a result, the stimulated emission M is emitted from the area corresponding to the width $d_L$ and the area adjacent thereto in proportion to the amount of radiation energy stored thereon. The stimulated emission M is made to a parallel light 5 bundle by the first SELFOC lens array 15, is transmitted through the dichroic mirror 14 and enters the second SELFOC lens array 16. Then the stimulated emission M is converged onto the light receiving faces of photoelectric convertor elements 21 by the second SELFOC lens array 16. At this time, the stimulating light beam L reflected by the surface of the stimulable phosphor sheet 50 is cut by the stimulating light cut filter 17.

As shown in FIG. 3, the line sensor 20 receives 30% of the amount of stimulated emission M corresponding to the over-spread part $d_W$, of course, in addition to the amount of stimulated emission corresponding to the width $d_L$ of the line stimulating light beam L.

Though, in this embodiment, the optical system between the stimulable phosphor sheet 50 and the line sensor 20 is a 1:1 imaging optical system for the purpose of simplicity, the optical system maybe an enlargement/reduction optical system.

In such a case, the size of each photo electric convertor elements and the number of the photoelectric convertor element arrays in the transverse direction of the line sensor may be determined according to the ratio of reduction or enlargement. The signals obtained by photoelectric conversion of the stimulated emission M received by the photoelectric convertor elements 21 are input into an external image processing apparatus or the like by way the image signal read-out means 30 and a radiation image is reproduced on the basis of the image signals.

Thus, in the radiation image read-out apparatus of this embodiment, 30% of the amount of stimulated emission M corresponding to the over-spread part $d_W$, in addition to the amount of stimulated emission corresponding to the width $d_L$ of the line stimulating light beam L, is received by the line sensor 20 the width ($d_P$) of which is set according to the width ($d_M$) of the stimulated emission M as measured on the plane of the light receiving face of the line sensor 20. Accordingly, the stimulated emission M corresponding to the over-spread part can be efficiently accumulated without increasing noise and without substantially adding to the cost.

When the size of each photoelectric convertor element 21 in the longitudinal direction is smaller than that in the transverse direction in the radiation image read-out apparatus of this embodiment, the stimulated emission accumulating efficiency can be increased without deteriorating the reading density (pixel density).

Further, in the radiation image read-out apparatus of the first embodiment, the optical system is arranged so that the path of the stimulating light beams L partly overlaps with the path of the stimulated emission M in order to reduce the overall size of the apparatus, the optical system need not be limited to such an arrangement. For example, an optical system in which the path of the stimulating light beams L does not overlap with the path of the stimulated emission M as shown in FIG. 6 may be employed.

The radiation image read-out apparatus in accordance with a second embodiment of the present invention shown in FIG. 6 comprises an endless belt 40 for conveying the stimulable phosphor sheet 50, a broad area laser 11 which emits a line stimulating light beam L at about 45° to the surface of the stimulable phosphor sheet 50, an optical system 12 which is formed by a combination of a collimator lens which condenses the line stimulating light beam L emitted from the broad area laser 11 and a toric lens which spreads the light beam only in one direction and projects the line stimulating light beam L onto the surface of the stimulable phosphor sheet 50; a SELFOC lens array 16 the optical axis of which is at about 45° to the surface of the stimulable phosphor sheet 50 and about 90° to the direction of travel of the line stimulating light beam L and which converges the stimulated emission M emitted from the stimulable phosphor sheet 50 upon exposure to the stimulating light L onto the light receiving face of a line sensor 20; a stimulating light cut filter 17 which cuts the stimulating light L in the stimulated emission N entering the SELFOC lens array 16; the line sensor 20 which has an array of photoelectric convertor elements 21 which receive the stimulated emission M and convert it into an electric image signal; and an image signal reading means 30 which reads the signals S from the respective photoelectric convertor elements and outputs the signals to an external image processing apparatus or the like.

The SELFOC lens array 16 images a light emitting region of the stimulable phosphor sheet 50 on the light receiving face of the line sensor 20 in a natural size, and the optical system 12 formed by the collimator lens and the toric lens enlarges the image of the line stimulating light beam L from the broad area laser 11 to a desired size, thereby changing the irradiation size.

Operation of the radiation image read-out apparatus of this embodiment will be described, hereinbelow.

The endless belt 40 is driven to convey the stimulable phosphor sheet 50 stored thereon a radiation image in the direction of arrow Y in FIG. 6.

While the broad area laser 11 emits a line stimulating light beam L about 100 μm wide substantially at 45° to the surface of the stimulable phosphor sheet 50. The line stimulating light beam L is converted to a parallel light beam by the optical system 12 (the collimator lens and the toric lens) and caused to impinge upon the surface of the stimulable phosphor sheet 50 at about 45° thereto. At this time, the stimulating light beam L irradiates a linear region on the stimulable phosphor sheet 50 about 100 μm wide ($d_L$=about 100 μm) which extends in the direction of arrow X.

The line stimulating light beam L impinging upon the stimulable phosphor sheet 50 stimulates the stimulable phosphor in the area corresponding to its width $d_L$ and at the same time is scattered inside the stimulable phosphor sheet 50 to stimulate also the stimulable phosphor near the area corresponding to the width $d_L$. As a result, the stimulated emission M is emitted from the area corresponding to the width $d_L$ and the area adjacent thereto in proportion to the amount of radiation energy stored thereon. The stimulated emission M passes through the stimulating light cut filter 17 and enters the SELFOC lens array 16. Then the stimulated emission M is converged onto the light receiving faces of photoelectric convertor elements 21. The stimulating light beam L reflected by the surface of the stimulable phosphor sheet 50 is cut by the stimulating light cut filter 17.

Also, in the radiation image read-out apparatus of this embodiment, 30% of the amount of stimulated emission M corresponding to the over-spread part $d_W$, in addition to the amount of stimulated emission corresponding to the width $d_L$ of the line stimulating light beam L, is received by the line sensor 20 the width ($d_P$) of which is set according to the width ($d_M$) of the stimulated emission M as measured on the plane of the light receiving face of the line sensor 20. Accordingly, the stimulated emission M corresponding to the over-spread part can be efficiently accumulated without increasing noise and without substantially adding to the cost.

Though, in the first and second embodiments described above, the line stimulating light beam L is projected onto the same surface of the stimulable phosphor sheet 50 as that the line sensor 20 is opposed to, the line stimulating light beam L may be projected onto the surface of the stimulable phosphor sheet 50 opposite to that the line sensor 20 is opposed to as shown in FIG. 7. In the latter case, the support film or the substrate on which the stimulable phosphor layer is formed should be transparent to the stimulated emission M.

The radiation image read-out apparatus in accordance with a third embodiment of the present invention shown in FIG. 7 comprises an endless belt 40 for conveying the stimulable phosphor sheet 50, a broad area laser 11 which emits a line stimulating light beam L substantially in perpendicular to the surface of the stimulable phosphor sheet 50, an optical system 12 which is formed by a combination of a collimator lens which condenses the line stimulating light beam L emitted from the broad area laser 11 and a toric lens which spreads the light beam only in one direction and projects the line stimulating light beam L onto the upper surface of the stimulable phosphor sheet 50; a SELFOC lens array 16 the optical axis of which is at about 90° to the surface of the stimulable phosphor sheet 50 and which converges the stimulated emission M emitted from the lower side of the stimulable phosphor sheet 50 upon exposure to the stimulating light L onto the light receiving face of a line sensor 20; a stimulating light cut filter 17 which cuts the stimulating light L in the stimulated emission N entering the SELFOC lens array 16; the line sensor 20 which has an array of photoelectric convertor elements 21 which receive the stimulated emission M and convert it into an electric image signal; and an image signal reading means 30 which reads the signals S from the respective photoelectric convertor elements and outputs the signals to an external image processing apparatus or the like. The broad area laser 11 and the optical system 12 are on one side of the stimulable phosphor sheet 50 (above the stimulable phosphor sheet 50) and the stimulating light cut filter 17, the SELFOC lens array 16 and the line sensor 20 are on the other side of the stimulable phosphor sheet 50 (below the stimulable phosphor sheet 50).

The SELFOC lens array 16 images a light emitting region of the stimulable phosphor sheet 50 on the light receiving face of the line sensor 20 in a natural size, and the optical system 12 formed by the collimator lens and the toric lens enlarges the image of the line stimulating light beam L from the broad area laser 11 to a desired size, thereby changing the irradiation size.

Operation of the radiation image read-out apparatus of this embodiment will be described, hereinbelow.

The endless belt 40 is driven to convey the stimulable phosphor sheet 50 stored thereon a radiation image in the direction of arrow Y in FIG. 7.

While the broad area laser 11 emits a line stimulating light beam L about 100 μm wide substantially in perpendicular to the surface of the stimulable phosphor sheet 50. The line stimulating light beam L is converted to a parallel light beam by the optical system 12 (the collimator lens and the toric lens) and caused to impinge upon the surface of the stimulable phosphor sheet 50 substantially in perpendicular thereto. At this time, the stimulating light beam L irradiates a linear region on the stimulable phosphor sheet 50 about 100 μm wide ($d_L$=about 100 μm) which extends in the direction of arrow X.

The line stimulating light beam L impinging upon the stimulable phosphor sheet 50 stimulates the stimulable phosphor in the area corresponding to its width $d_L$ and at the same time is scattered inside the stimulable phosphor sheet 50 to stimulate also the stimulable phosphor near the area corresponding to the width $d_L$. As a result, the stimulated emission M is emitted from the area corresponding to the width $d_L$ and the area adjacent thereto in proportion to the amount of radiation energy stored thereon. A part of the stimulated emission M emanates downward from the stimulable phosphor sheet 50. The stimulated emission M emanating downward from the stimulable phosphor sheet 50 passes through the stimulating light cut filter 17 and enters the SELFOC lens array 16. Then the stimulated emission M is converged onto the light receiving faces of photoelectric convertor elements 21. The stimulating light beam L reflected by the surface of the stimulable phosphor sheet 50 is cut by the stimulating light cut filter 17.

Also, in the radiation image read-out apparatus of this embodiment, 30% of the amount of stimulated emission M corresponding to the over-spread part $d_W$, in addition to the amount of stimulated emission corresponding to the width $d_L$ of the line stimulating light beam L, is received by the line sensor 20 the width ($d_P$) of which is set according to the width ($d_M$) of the stimulated emission M as measured on the plane of the light receiving face of the line sensor 20. Accordingly, the stimulated emission M corresponding to the over-spread part can be efficiently accumulated without increasing noise and without substantially adding to the cost.

A radiation image read-out apparatus in accordance with a fourth embodiment of the present invention will be described with reference to FIGS. 8 and 9, hereinbelow. In FIGS. 8 and 9, the radiation image read-out apparatus comprises an endless belt (a sub-scanning means) 40 which conveys a stimulable phosphor sheet 50 (storing thereon a radiation image) in the direction of arrow Y; a broad area laser 11 which emits a line stimulating light beam L 100 μm wide in parallel to the surface of the stimulable phosphor sheet 50; an optical system 12 formed by a combination of a collimator lens which condenses the line stimulating light beam L emitted from the broad area laser 11 and a toric lens which spreads the light beam only in one direction; a dichroic mirror 14 which is inclined at 45° to the surface of the stimulable phosphor sheet 50 and transmits stimulated emission M while reflecting the line stimulating light beam L; a first a SELFOC lens array 15 which is an array of a plurality of refractive index profile type lenses, converges the line stimulating light beam L reflected by the dichroic mirror 14 to impinge upon the stimulable phosphor sheet 50 in a pattern of a line about 100 μm wide extending in the direction of arrow X and collimates into a parallel light bundle stimulated emission M emitted from the part of the stimulable phosphor sheet 50 exposed to the line stimulating light beam; a second SELFOC lens array 16 which converges the stimulated emission M which passes through the dichroic mirror 14 onto the light receiving face of a line sensor 20; a stimulating light cut filter 17 which cuts the stimulating light L in the stimulated emission M passing through the second SELFOC lens array 16; the line sensor 20 which has an array of photoelectric convertor elements 21 which receive the stimulated emission M and convert it into an electric image signal; an adder means 31 which adds up the signals output from the respective photoelectric convertor elements 21 with respect to the portions of the stimulable phosphor sheet 50 and an image signal reading means 30a which outputs an image signal obtained by addition of the signals.

The first SELFOC lens array 15 images a light emitting region of the stimulable phosphor sheet 50 on the dichroic mirror 14 in a natural size, and the second SELFOC lens array 16 transfers the image of the light emitting region of the stimulable phosphor sheet 50 on the dichroic mirror 14 to the light receiving face of the line sensor 20 in a natural size.

The optical system 12 formed by the collimator lens and the toric lens enlarges the image of the line stimulating light beam L from the broad area laser 11 to a desired size.

As shown in FIG. 9, the line sensor 20 comprises a plurality of photoelectric convertor element arrays arranged in the direction of conveyance of the stimulable phosphor sheet 50 (in the direction of arrow Y) each array comprising a number of (e.g., 1000 or more) photoelectric convertor elements 21 arranged in the direction of arrow X. Each photoelectric convertor element 21 maybe, for instance, an amorphous silicon sensor, a CCD sensor or a MOS image sensor, and has a light receiving face of about 100 μm×100 μm. The number of the photoelectric convertor element arrays in the direction of arrow Y is set so that 30% to 90% of the amount of stimulated emission corresponding to a part of the stimulated emission spreading beyond the width of the line stimulating light beam as measured on the plane of the light receiving face of the line sensor can be received by the line sensor.

As can be seen from FIGS. 5A and 5B, in this particular embodiment, since the width of the line stimulating light beam is 100 μm, in order to receive 30% ($d_W$=75 μm) to 90% ($d_W$=500 μm) of the amount of stimulated emission corresponding to the over-spread part $d_W$, the sum W of the widths of the photoelectric convertor elements arranged in the direction of arrow Y should be 250 μm to 1100 μm, which corresponds to three to eleven photoelectric convertor element arrays arranged in the direction of arrow Y, according to the aforesaid formula (1).

In this particular embodiment, three photoelectric convertor element arrays should be arranged in the direction of arrow Y.

Operation of the radiation image read-out apparatus of this embodiment will be described, hereinbelow.

The endless belt 40 is driven to convey the stimulable phosphor sheet 50 stored thereon a radiation image in the direction of arrow Y in FIG. 1. The speed of the endless belt 40 or the stimulable phosphor sheet 50 is input into the adder means 31.

While the broad area laser 11 emits a line stimulating light beam L about 100 $\mu$m wide substantially in parallel to the surface of the stimulable phosphor sheet 50. The line stimulating light beam L is converted to a parallel light beam by the optical system 12 (the collimator lens and the toric lens) and reflected by the dichroic mirror 14 to impinge upon the stimulable phosphor sheet 50 in perpendicular thereto after condensed by the first SELFOC lens array 15 into a line beam about 100 $\mu$m wide ($d_L$=about 100 $\mu$m) which extends in the direction of arrow X on the surface of the stimulable phosphor sheet 50.

The line stimulating light beam L impinging upon the stimulable phosphor sheet 50 stimulates the stimulable phosphor in the area corresponding to its width $d_L$ and at the same time is scattered inside the stimulable phosphor sheet 50 to stimulate also the stimulable phosphor near the area corresponding to the width $d_L$. As a result, the stimulated emission M is emitted from the area corresponding to the width $d_L$ and the area adjacent thereto in proportion to the amount of radiation energy stored thereon. The stimulated emission M is made to a parallel light bundle by the first SELFOC lens array 15, is transmitted through the dichroic mirror 14 and enters the second SELFOC lens array 16. Then the stimulated emission M is converged onto the light receiving faces of photoelectric convertor elements 21. At this time, the stimulating light beam L reflected by the surface of the stimulable phosphor sheet 50 is cut by the stimulating light cut filter 17.

As shown in FIG. 9, the line sensor 20 receives a little more than 30% of the amount of stimulated emission M corresponding to the over-spread part $d_W$, of course, in addition to the amount of stimulated emission corresponding to the width $d_L$ of the line stimulating light beam L.

Though, in this embodiment, the optical system between the stimulable phosphor sheet 50 and the line sensor 20 is a 1:1 imaging optical system for the purpose of simplicity, the optical system may be an enlargement/reduction optical system. In such a case, the size of each photoelectric convertor elements and the number of the photoelectric convertor element arrays in the transverse direction of the line sensor may be determined according to the ratio of reduction or enlargement.

The signals Q obtained by photoelectric conversion of the stimulated emission M received by the photoelectric convertor elements 21 are input into the adder means 31.

The adder means 31 stores in storage regions provided corresponding to portions of the stimulable phosphor sheet 50 the signals Q from the corresponding photoelectric convertor elements 21 on the basis of the speed of the endless belt 40, and accumulates the signals Q for the same portion of the stimulable phosphor sheet 50.

This will be described in more detail with reference to FIGS. 10 to 13, hereinbelow.

Figure 10:
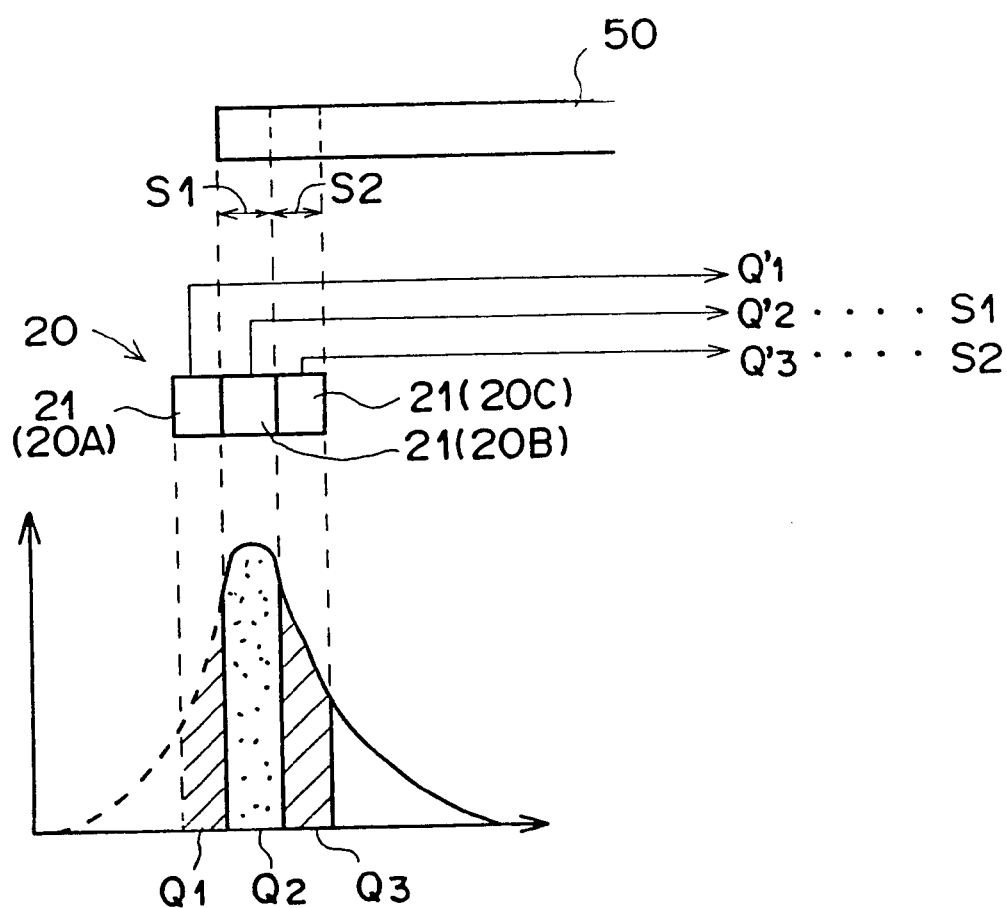
Figure 11:
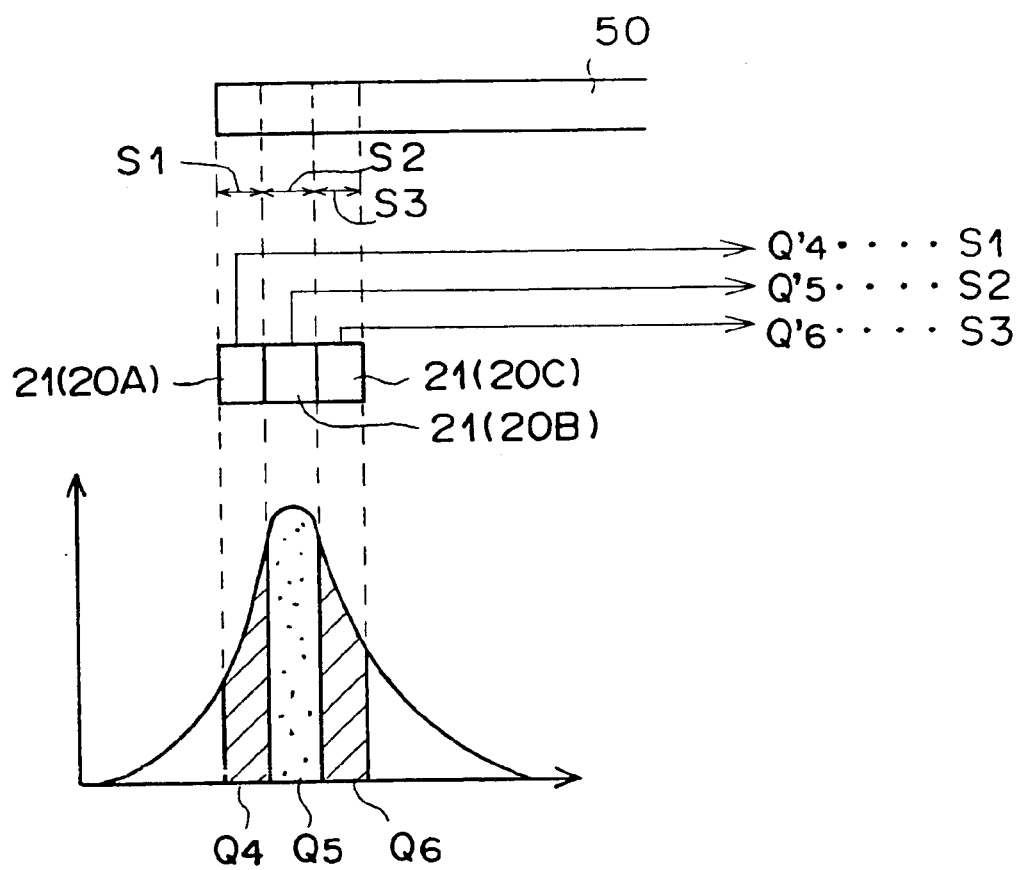

It is first assumed that the line stimulating light beam L is focused on an extreme edge region S1 as seen in the direction of conveyance of the stimulable phosphor sheet 50 (the direction of arrow Y) as shown in FIG. 10. In this state, stimulated emission M is emitted from not only the region S1 but also the region S2 on one side of the region S1 due to spread of the stimulating light beam L as described above and as shown by the stimulating emission distribution curve in FIG. 10. The amount of stimulated emission M emitted from the region S1 is Q2. The stimulated emission of Q2 emitted from the region S1 is received by the photoelectric convertor elements 21 of the array 20B (FIG. 3), 30% (=Q3) of stimulated emission emitted from the region S2 is received by the photoelectric convertor elements 21 of the array 20C.

Each of the photoelectric convertor elements 21 of the array 20B converts the amount Q2 of stimulated emission M into an electric charge Q'2 and transfers it to the adder means 31. The adder means 31 stores the electric charge Q'2 transferred from the photoelectric convertor element 21 of the array 20B in the memory (see FIG. 13) corresponding to the region S1 of the stimulable phosphor sheet 50 on the basis of the running speed of the endless belt 40. Similarly, each of the photoelectric convertor elements 21 of the array 20C converts the amount Q3 of stimulated emission M into an electric charge Q'3 and transfers it to the adder means 31. The adder means 31 stores the electric charge Q'3 transferred from the photoelectric convertor element 21 of the array 20C in the memory corresponding to the region S2 of the stimulable phosphor sheet 50 on the basis of the running speed of the endless belt 40.

Then when the stimulable phosphor sheet 50 is conveyed and the line stimulating light beam L comes to be focused onto the region S2, stimulated emission M is emitted from not only the region S2 but also the regions S1 and S3 on opposite sides of the region S2. The photoelectric convertor elements 21 of the array 20A receives 30% (=Q4) of stimulated emission emitted from the region S1, the photoelectric convertor elements 21 of the array 20B receives the whole stimulated emission M emitted from the region S2, and the photoelectric convertor elements 21 of the array 20C receives 30% (=Q6) of stimulated emission emitted from the region S3. The photoelectric convertor elements 21 of the arrays 20a, 20B and 20C respectively convert the amounts Q4, Q5 and Q6 of stimulated emission M into electric charges Q'4, Q'5 and Q'6 and transfer them to the adder means 31. The adder means 31 adds the electric charges Q'4, Q'5 and Q'6 transferred from the photoelectric convertor elements 21 of the arrays 20A to 20C to the preceding values in the memories respectively corresponding to the regions S1 to S3 of the stimulable phosphor sheet 50 on the basis of the running speed of the endless belt 40.

When the stimulable phosphor sheet 50 is conveyed and the line stimulating light beam L comes to be focused onto the region S3 as shown in FIG. 12, the adder means 31 adds the electric charges Q'7, Q'8 and Q'9 transferred from the photoelectric convertor elements 21 of the arrays 20A to 20C to the preceding values in the memories respectively corresponding to the regions S2 to S4 of the stimulable phosphor sheet 50 on the basis of the running speed of the endless belt 40.

The similar processing is repeated as the stimulable phosphor sheet 50 is conveyed by the endless belt 40 and the sum of the amount of stimulated emission M emitted from each portion of the stimulable phosphor sheet 50 is stored in the corresponding memory as shown in FIG. 13.

The image signal reading means 30a outputs the signals stored in the memories to an external image processing apparatus or the like and an image is reproduced on the basis of the signals.

Thus, in the radiation image read-out apparatus of this embodiment, 30% of the amount of stimulated emission M corresponding to the over-spread part $d_W$, in addition to the amount of stimulated emission corresponding to the width $d_L$ of the line stimulating light beam L, is received by the line sensor 20 the width ($d_P$) of which is smaller the width ($d_M$) of the stimulated emission M as measured on the plane of the light receiving face of the line sensor 20. Accordingly, the stimulated emission M corresponding to the over-spread part can be efficiently accumulated without increasing noise and without substantially adding to the cost.

In the fourth embodiment described above, the line sensor 20 has photoelectric convertor elements 21 which are arranged in a straight line in each of the longitudinal and transverse directions of the stimulated emission but the photoelectric convertor elements 21 may be arranged in other patterns. For example, the photo electric convertor elements 21 may be arranged zigzag in the transverse direction (the direction of arrow Y) of the stimulated emission and arranged in a straight line in the longitudinal direction (the direction of arrow X) as shown in FIG. 14, and the photoelectric convertor elements 21 may be arranged zigzag in the longitudinal direction (the direction of arrow X) of the stimulated emission and arranged in a straight line in the transverse direction (the direction of arrow Y) as shown: in FIG. 15.

Further, in the radiation image read-out apparatus of the fourth embodiment, the optical system is arranged so that the path of the stimulating light beams L partly overlaps with the path of the stimulated emission M in order to reduce the overall size of the apparatus, the optical system need not be limited to such an arrangement. For example, an optical system in which the path of the stimulating light beams L does not overlap with the path of the stimulated emission M as shown in FIG. 6 or FIG. 7 may be employed.

Figure 16A:
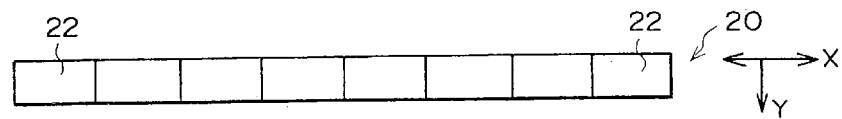
Figure 16B:
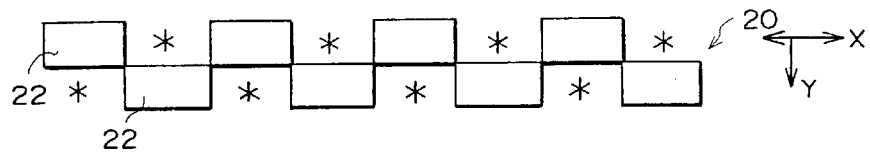
Figure 16C:
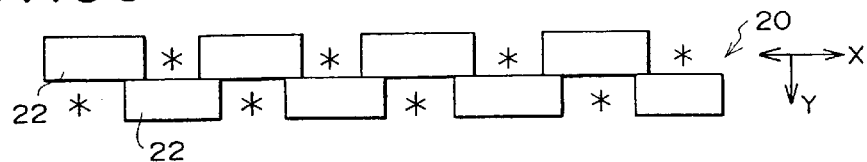

Further, in the embodiments described above, the line sensor may comprise a plurality of sensor chips each comprising a plurality of photoelectric convertor elements. It is difficult to make a long line sensor as one chip though may be not impossible. Accordingly, as disclosed in our Japanese Unexamined Patent Publication No. 2000-66316, from the viewpoint of easiness of manufacture, it is preferred that the line sensor 20 be formed of a plurality of small sensor chips each comprising a plurality of photoelectric convertor elements. In this case, the chips may be arranged in a straight line in the longitudinal direction of the line sensor or zigzag in the longitudinal direction of the line sensor. FIGS. 16A to 16C show examples of arrangement of the small sensor chips. In the example shown in FIG. 16A, small chips 22 (e.g., CCD chips, amorphous silicon chips, MOS image sensors) are arranged in a straight line in the longitudinal direction of the line sensor 22. In the example shown in FIG. 16B, small chips 22 are arranged zigzag in the longitudinal direction of the line sensor 22 not to overlap in the transverse direction. In the example shown in FIG. 16C, small chips 22 are arranged zigzag in the longitudinal direction of the line sensor 22 to partly overlap in the transverse direction. An electric circuit for correcting misalignment of pixels or the like may be disposed in the vacant region indicated at in FIGS. 16B and 16C.

Figure 16D:
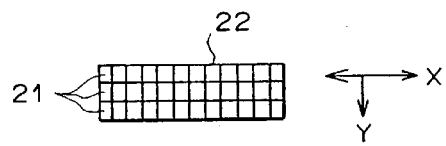
Figure 16E:
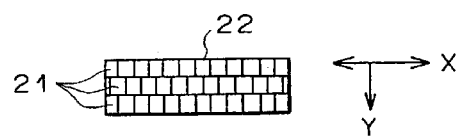
Figure 16F:
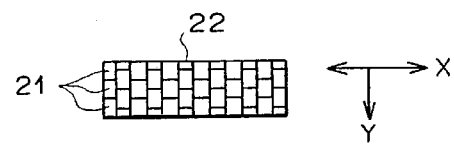

FIGS. 16D to 16F show examples of arrangement of the photoelectric convertor elements 21 in each of the small sensor chips 22. In the example shown in FIG. 16D, the photoelectric convertor elements 21 are arranged in a straight line in both the longitudinal direction and the transverse direction. In the example shown in FIG. 16E, the photoelectric convertor elements 21 are arranged in a straight line in the longitudinal direction but zigzag in the transverse direction. In the example shown in FIG. 16F, the photoelectric convertor elements 21 are arranged in a straight line in the transverse direction but zigzag in the longitudinal direction.

The number of the photoelectric convertor elements 21 in each chip 22 in the longitudinal direction of the line sensor 20 may be, for instance, 10 to 100.

Figure 16G:
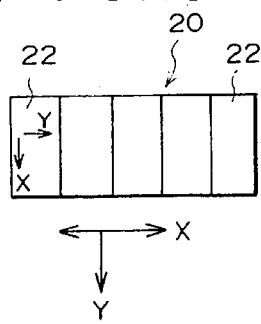
Figure 16H:
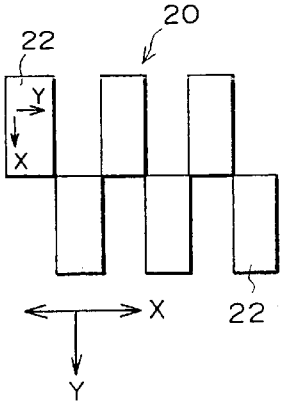
Figure 16I:
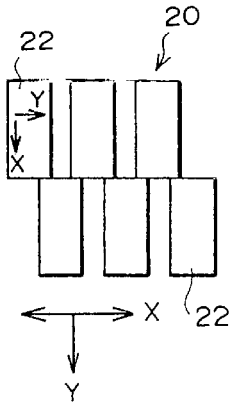

The small sensor chips 22 may be arranged sideways as shown in FIGS. 16G to 16I.

By forming a long line sensor 20 by way of a plurality of small sensor chips 22 in this manner, production of the long line sensor 20 is facilitated and the manufacturing yield is increased, which reduces the cost.

When the line sensor 20 is formed by connecting a plurality of small sensor chips 22, correction of misalignment of pixels can be effected more easily as compared with when the long line sensor is made as one chip since signals can be taken out separately from each chip 22. Especially, when the small chips 22 are arranged zigzag in the longitudinal direction of the line sensor 22 to partly overlap in the transverse direction, the correction of misalignment of pixels can be effected more easily by the use of data from the overlapping portions.

When a plurality of small sensor chips are arranged in the longitudinal direction, it is preferred to arrange the sensor chips not to form a dead zone between adjacent chips. When this is difficult, it is preferred that the image data be corrected to compensate for the dead zones so that the portions between the chips are smooth in the output image.

A radiation image read-out apparatus in accordance with a fifth embodiment of the present invention will be described with reference to FIGS. 17 and 18, hereinbelow. In FIGS. 17 and 18, the radiation image read-out apparatus comprises an endless belt (a sub-scanning means) 40 which conveys a stimulable phosphor sheet 50 (storing thereon a radiation image) in the direction of arrow Y; a broad area laser 11 which emits a line stimulating light beam L 100 $\mu$m wide substantially in perpendicular to the surface of the stimulable phosphor sheet 50; an optical system 12 which is formed by a combination of a collimator lens which condenses the line stimulating light beam L emitted from the broad area laser 11 and a toric lens which spreads the light beam only in one direction, and projects a line stimulating light beam L onto the surface of the stimulable phosphor sheet 50; a pair of SELFOC lens arrays 16 which are disposed on opposite sides of the line stimulating light beam L and converge the stimulated emission M emitted from the stimulable phosphor sheet 50 upon exposure to the stimulating light L onto the light receiving faces of a pair of line sensors 20; a pair of stimulating light cut filters 17 which cut the stimulating light L in the stimulated emission M passing through the SELFOC lens array 16; the pair of line sensors 20 each of which receives the stimulated emission M and convert it into an electric image signal; and an image signal reading means 30a provided with an adder means 31 which adds up the signals output from the respective line sensors 20.

The SELFOC lens arrays 16 image a light emitting region of the stimulable phosphor sheet 50 on the light receiving faces of the line sensors 20 in a natural size, and the optical system 12 formed by the collimator lens and the toric lens enlarges the image of the line stimulating light beam L from the broad area laser 11 to a desired size, thereby changing the irradiation size.

As shown in FIG. 19, each of the line sensors 20 comprises a plurality of sensor chips 22 arranged in a straight line extending in the longitudinal direction of the line sensor 20.

In this embodiment, the width of the stimulated emission detecting means is equivalent to the sum of the widths Wa and Wb (FIG. 19) of the respective line sensors 20, and is such that 30% to 90% of the amount of stimulated emission corresponding to a part of the stimulated emission spreading beyond the width of the line stimulating light beam as measured on the plane of the light receiving face of the stimulated emission detecting means can be received in addition to the amount of stimulated emission corresponding to the width of the line stimulating light beam.

It is preferred that the line sensors 20 be disposed as close to just above the line stimulating light beam L on the stimulable phosphor sheet as possible. Three or more line sensors may be employed as the stimulated emission detecting means.

Operation of the radiation image read-out apparatus of this embodiment will be described, hereinbelow.

The endless belt 40 is driven to convey the stimulable phosphor sheet 50 stored thereon a radiation image in the direction of arrow Y in FIG. 1. The speed of the endless belt 40 or the stimulable phosphor sheet 50 is input into the image signal read-out means 30a.

While the broad area laser 11 emits a line stimulating light beam L about 100 μm wide substantially in perpendicular to the surface of the stimulable phosphor sheet 50. The line stimulating light beam L is converted to a parallel light beam by the optical system 12 (the collimator lens and the toric lens) and projected onto the surface of the stimulable phosphor sheet 50 substantially in perpendicular to the surface of the stimulable phosphor sheet 50 in the form of a line beam which extends in the direction of arrow X on the surface of the stimulable phosphor sheet 50.

The line stimulating light beam L impinging upon the stimulable phosphor sheet 50 stimulates the stimulable phosphor in the area corresponding to its width and at the same time is scattered inside the stimulable phosphor sheet 50 to stimulate also the stimulable phosphor near the area corresponding to the width. As a result, the stimulated emission M is emitted from the area corresponding to the width and the area adjacent thereto in proportion to the amount of radiation energy stored thereon. The stimulated emission M enters the SELFOC lens arrays 16 and converged onto the light receiving faces of line sensors 20. The stimulating light beam L reflected by the surface of the stimulable phosphor sheet 50 is cut by the stimulating light cut filter 17.

Each of the line sensors 20 converts the amount of stimulated emission M into an electric charge and transfers it to the image read-out means 30a. The image read-out means 30a digitizes the image signals from the respective line sensors 20 and the adder means 31 adds up the digital signals.

Also, in the radiation image read-out apparatus of this embodiment, 30% of the amount of stimulated emission M corresponding to the over-spread part, in addition to the amount of stimulated emission corresponding to the width of the line stimulating light beam L, is received by the line sensor 20 the width of which is set according to the width of the stimulated emission M as measured on the plane of the light receiving face of the line sensor 20. Accordingly, the stimulated emission M corresponding to the over-spread part can be efficiently accumulated without increasing noise and without substantially adding to the cost.

Further, in the fifth embodiment, since the junctions of the sensor chips 22 in the line sensors 20 (dead zones where the stimulated emission cannot be detected) are staggered in the longitudinal direction of the line sensors 20, the dead zones can be compensated for by the corresponding censor chips in the other line sensor 20, whereby generation of artifact or the like due to lack of detected stimulated emission can be avoided.

Though, in the sixth embodiment, a pair of line sensors 20 are disposed on the same side of the stimulable phosphor sheet 50, a pair of line sensors 20 may be disposed on opposite sides of the stimulable phosphor sheet 50 as shown in FIG. 20.

When the stimulable phosphor sheet 50 is an anisotropic stimulable phosphor sheet which emits the stimulated emission in a direction inclined at a predetermined angle to the direction of thickness of the sheet, spread of stimulated emission itself is suppressed and accordingly the stimulated emission accumulating efficiency can be further increased. As the anisotropic stimulable phosphor sheet, a partition anisotropic stimulable phosphor sheet where the stimulable phosphor layer is divided into a number of micro cells by partition members extending in the direction of thickness of the stimulable phosphor sheet can be employed. However, when the anisotropic stimulable phosphor sheet is formed by anisotropic deposition, the purity of the stimulable phosphor can be increased and the stimulated emission emitting efficiency can be increased, which increases the stimulated emission accumulating efficiency. Further, the anisotropic stimulable phosphor sheet formed by anisotropic deposition is more easy to control as compared with anisotropic stimulable phosphor sheets formed by other methods.

Though preferred embodiments of the present invention have been described above, the present invention need not be limited to the illustrated embodiments but the illustrated embodiments can be variously modified. For example, the stimulating light beam source, the optical system between the light beam source and the stimulable phosphor sheet, the optical system between the stimulable phosphor sheet and the line sensor, the line sensor and the like may be variously modified. The radiation image read-out apparatus of the present invention may be provided with an image processing apparatus for variously processing the image signal obtained, an erasing means for erasing a residual radiation image on the stimulable phosphor sheet, and the like.

Further, a stimulable phosphor sheet for energy subtraction, where a pair of stimulable phosphor layers different in radiation energy absorbing properties are formed on one support film so that different radiation images of the same object are simultaneously recorded, may be used. In this case, the stimulated emission M emitted from the respective stimulable phosphor layers is separately detected and the value of the image signal is subtracted pixel by pixel.

What is claimed is:

1. A radiation image read-out apparatus comprising:
 a line stimulating light beam source which projects a line stimulating beam extending in a main scanning direction onto a stimulable phosphor sheet storing thereon radiation image information;
 stimulated emission detecting means for receiving stimulated emission emitted upon exposure to the line stimulating beam from a line portion of the stimulable phosphor sheet exposed to the line stimulating beam and for converting the amount of stimulated emission received to an electric signal;
 sub-scanning means for moving the line stimulating beam and the stimulated emission detecting means relative to the stimulable phosphor sheet in a sub-scanning direction;
 image signal read-out means for reading out the output of the stimulated emission detecting means;
 wherein the stimulated emission detecting means has a light receiving face having a width in a transverse direction of the line portion of the stimulable phosphor sheet exposed to the line stimulating beam, such that 30% to 90% of the amount of stimulated emission corresponding to a part of the stimulated emission spreading beyond a width of the line stimulating beam as measured on a plane of the light receiving face of the stimulated emission detecting means is receivable by the light receiving face in addition to the amount of stimulated emission corresponding to the width of the line stimulating beam.

2. A radiation image read-out apparatus as defined in claim 1, wherein the stimulated emission detecting means comprises a line sensor having an array of photoelectric convertor elements arranged in a longitudinal direction, and wherein the image signal read-out means reads out the output of each photoelectric convertor element in sequence in respective positions to which the photoelectric convertor element is moved by the sub-scanning means.

3. A radiation image read-out apparatus as defined in claim 2, wherein a size of each photoelectric convertor element in the longitudinal direction is smaller than a size of each photoelectric convertor element in the transverse direction.

4. A radiation image read-out apparatus as defined in claim 1, wherein the stimulated emission detecting means comprises a line sensor having a two-dimensional array of photoelectric convertor elements, and wherein the image signal read-out means is provided with operation means for operational processing the outputs of each photoelectric convertor element.

5. A radiation image read-out apparatus as defined in claim 4, wherein the line sensor comprises a plurality of sensor chips arranged in a straight line in a longitudinal direction of the line sensor, each comprising a plurality of photoelectric convertor elements.

6. A radiation image read-out apparatus as defined in claim 4, wherein the line sensor comprises a plurality of sensor chips arranged zigzag in a longitudinal direction of the line sensor, each comprising a plurality of photoelectric convertor elements.

7. A radiation image read-out apparatus as defined in claim 4, wherein the line sensor comprises a plurality of sensor chips, each comprising a plurality of photoelectric convertor elements in both a longitudinal direction and the transverse direction.

8. A radiation image read-out apparatus as defined in claim 1, wherein the stimulated emission detecting means comprises a plurality of line sensors arranged in the transverse direction, and wherein the image signal read-out means is provided with operation means for operational processing the outputs of the line sensors.

9. A radiation image read-out apparatus as defined in claim 1, wherein the stimulable phosphor sheet is an anisotropic stimulable phosphor sheet which emits the stimulated emission in a direction inclined at a predetermined angle to a direction of thickness of the anisotropic stimulable phosphor sheet.

10. A radiation image read-out apparatus as defined in claim 9, wherein the anisotropic stimulable phosphor sheet is formed by anisotropic deposition.

11. A radiation image read-out apparatus as defined in claim 1, wherein a collector optical system for collecting the stimulated emission on the light receiving face of the stimulated emission detecting means is disposed between the stimulable phosphor sheet and the stimulated emission detecting means.

12. A radiation image read-out apparatus as defined in claim 1, wherein a stimulating light cut filter, which does not transmit the line stimulating beam but which does transmit the stimulated emission, is provided between the stimulable phosphor sheet and the stimulated emission detecting means to prevent the line stimulating beam from entering the stimulated emission detecting means.

* * * * *